(12) United States Patent
Look et al.

(10) Patent No.: US 9,053,080 B2
(45) Date of Patent: Jun. 9, 2015

(54) METHOD AND APPARATUS FOR PROVIDING ACCESS TO AND WORKING WITH ARCHITECTURAL DRAWINGS ON A PERSONAL DIGITAL ASSISTANT

(71) Applicant: Autodesk, Inc., San Rafael, CA (US)

(72) Inventors: Douglas G. Look, Ithaca, NY (US); Lawrence David Felser, Ithaca, NY (US); John Rogers Wallace, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 292 days.

(21) Appl. No.: 13/768,293

(22) Filed: Feb. 15, 2013

(65) Prior Publication Data

US 2013/0159833 A1 Jun. 20, 2013

Related U.S. Application Data

(60) Division of application No. 12/336,392, filed on Dec. 16, 2008, now Pat. No. 8,402,392, which is a continuation of application No. 10/479,909, filed as application No. PCT/US01/02310 on Jan. 24, 2001, now Pat. No. 7,484,183.

(60) Provisional application No. 60/177,988, filed on Jan. 25, 2000.

(51) Int. Cl.
| | |
|---|---|
| *G06F 3/048* | (2013.01) |
| *G06F 17/24* | (2006.01) |
| *G06F 3/0481* | (2013.01) |
| *G06F 3/14* | (2006.01) |
| *G06F 17/50* | (2006.01) |
| *G06Q 10/10* | (2012.01) |

(52) U.S. Cl.
CPC .......... *G06F 17/241* (2013.01); *G06F 3/04812* (2013.01); *G06F 3/1454* (2013.01); *G06F 3/0481* (2013.01); *G06F 17/5004* (2013.01); *G06F 2217/04* (2013.01); *G06Q 10/10* (2013.01)

(58) Field of Classification Search
CPC .......... G06F 17/30076; G06F 11/1448; G06F 3/1454; G06F 3/04812
See application file for complete search history.

(56) References Cited

U.S. PATENT DOCUMENTS

| | | | |
|---|---|---|---|
| 5,729,588 A | 3/1998 | Chin et al. | |
| 5,913,065 A | 6/1999 | Faustini | |
| 5,950,206 A | 9/1999 | Krause | |
| 6,054,990 A * | 4/2000 | Tran | 715/863 |

(Continued)

OTHER PUBLICATIONS

Day, "StudioDesk to Emerge from Autodesk Metamorphosis," Online! May 24, 2000, pp. 1-11.

(Continued)

*Primary Examiner* — Steven Sax
(74) *Attorney, Agent, or Firm* — Gates & Cooper LLP

(57) ABSTRACT

A method, apparatus, and article of manufacture provide access to architectural documents in a network based on-line web based system. Servers that are accessible from the Internet maintain persistent multiple architectural documents of different media types. An online user is provided, from the servers via the Internet, a set of basic virtual design tools that have persistent properties and may be copied. The virtual design tools may also be utilized to work with the architectural documents. A workspace is also provided for viewing, accessing, and modifying the architectural documents.

19 Claims, 17 Drawing Sheets

(56) References Cited

U.S. PATENT DOCUMENTS

| | | | |
|---|---|---|---|
| 6,275,976 B1 | 8/2001 | Scandura | |
| 6,342,901 B1 * | 1/2002 | Adler et al. | 715/700 |
| 6,457,065 B1 * | 9/2002 | Rich et al. | 719/328 |
| 6,518,988 B1 | 2/2003 | Aghevli | |
| 6,563,529 B1 | 5/2003 | Jongerius | |
| 6,564,246 B1 | 5/2003 | Varma et al. | |
| 6,570,590 B1 | 5/2003 | Dubrow et al. | |
| 6,638,313 B1 | 10/2003 | Freeman et al. | |
| 6,765,567 B1 | 7/2004 | Roberson et al. | |
| 6,775,819 B1 | 8/2004 | Hardikar et al. | |
| 6,912,293 B1 | 6/2005 | Korobkin | |
| 6,912,707 B1 | 6/2005 | Fontes, Jr. | |
| 6,959,268 B1 | 10/2005 | Myers, Jr. et al. | |
| 6,965,855 B1 | 11/2005 | Burbridge et al. | |
| 6,980,175 B1 * | 12/2005 | Narayanaswami | 345/2.3 |
| 6,983,226 B2 | 1/2006 | Kennefick | |
| 7,089,203 B1 | 8/2006 | Crookshanks | |
| 7,142,196 B1 * | 11/2006 | Connor et al. | 345/173 |
| 7,243,299 B1 * | 7/2007 | Rubin et al. | 715/209 |
| 7,366,980 B2 | 4/2008 | Small | |
| 7,484,183 B2 | 1/2009 | Look et al. | |
| 7,574,649 B1 | 8/2009 | Safars et al. | |
| 7,576,752 B1 * | 8/2009 | Benson et al. | 345/619 |
| 7,904,333 B1 * | 3/2011 | Perkowski | 705/14.4 |
| 2002/0055820 A1 | 5/2002 | Scannell | |
| 2002/0099552 A1 * | 7/2002 | Rubin et al. | 704/270 |
| 2002/0165894 A1 * | 11/2002 | Kashani | 709/102 |
| 2006/0085322 A1 | 4/2006 | Crookshanks | |

OTHER PUBLICATIONS

Gross et al., "Collaboration and Coordination in Architectural Design: Approaches to Computer Mediated Team Work," Georgia Institute of Technology, 1997, pp. 17-24.

Fu et al., "The Virtual Design Review," Comptuer-Aided Civil and Infrastructure Engineering (USA), vol. 14, No. 1, Jan. 1999, pp. 25-35.

Adobe: "Adobe Photoshop 5.0 Handbuch," Adobe Systems, Inc. pp. 25-57, 59-60, 173 and 257-260, 1998.

U.S. Appl. No. 10/479,909, filed Jun. 29, 2004.

U.S. Appl. No. 12/336,392, filed Dec. 16, 2008.

* cited by examiner

METHOD AND APPARATUS FOR PROVIDING ACCESS TO AND WORKING WITH ARCHITECTURAL DRAWINGS ON A PERSONAL DIGITAL ASSISTANT

CROSS-REFERENCE TO RELATED APPLICATIONS

This application is a divisional application and claims the benefit under 35 U.S.C. §120 of the following co-pending and commonly-assigned U.S. utility patent application(s), which is/are incorporated by reference herein:

Utility application Ser. No. 12/336,392, filed on Dec. 16, 2008, by Douglas G. Look, Larry David Felser, and John Rogers Wallace, entitled METHOD AND APPARATUS FOR PROVIDING ACCESS TO AND WORKING WITH ARCHITECTURAL DRAWINGS ON THE INTERNET, which application is a continuation of:

Utility application Ser. No. 10/479,909, filed on Jun. 29, 2004, by Douglas G. Look, Larry David Felser, and John Rogers Wallace, entitled METHOD AND APPARATUS FOR PROVIDING ACCESS TO AND WORKING WITH ARCHITECTURAL DRAWINGS ON THE INTERNET, now U.S. Pat. No. 7,484,183, issued on Jan. 27, 2009, which application claims:

the benefit under 35 U.S.C. §119(e) of the following commonly assigned U.S. Provisional patent application, which application is incorporated by reference herein: U.S. application Ser. No. 60/177,988, entitled "METHOD AND APPARATUS FOR PROVIDING ACCESS TO AND WORKING WITH ARCHITECTURAL DRAWINGS ON THE INTERNET," filed on Jan. 25, 2000, by Douglas G. Look, et. al., and the benefit under 35 U.S.C. §119(a)-(d) or (f), or 365(a)-(c) of the following commonly assigned PCT International Application designating the United States of America, which application is incorporated by reference herein: PCT International application serial number PCT/US01/02310, filed on Jan. 24, 2001, by Douglas G. Look, Larry David Felser, and John Rogers Wallace, entitled METHOD AND APPARATUS FOR PROVIDING ACCESS TO AND WORKING WITH ARCHITECTURAL DRAWINGS ON THE INTERNET.

BACKGROUND OF THE INVENTION

1. Field of the Invention

The present invention relates generally to accessing and modifying drawings on a computer, and in particular, to a method, apparatus, and article of manufacture for providing access to drawing information and for creating and modifying architectural drawings over the Internet.

2. Description of the Related Art

The use of Computer Aided Design (CAD) application programs is well known in the art. CAD application programs are often expensive, complex, and difficult to learn how to use. Additionally, architects, contractors, engineers, owners, and other parties involved with a project (referred to as project participants) are often mobile or at different locations. With new technology and the increased use of the Internet, project participants often have computers, Internet access, and personal digital assistants (PDAs). Further, the coordination and exchange of information between project participants can be increasingly complex. Existing prior art applications allow a user to download a drawing, edit the drawing, and upload the drawing after completing the edits. Further, the prior art does not provide the ability to capture a visual/virtual desktop from a computer to a hand held computing device or vice versa.

These problems may be better understood by describing prior art handheld computing devices.

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) ports for communication. As described above, PDAs (including available software) do not provide the ability to view and manipulate a virtual desktop. Further, the prior art does not provide for a virtual PDA that may be viewed and manipulated on a desktop computer.

SUMMARY OF THE INVENTION

One or more embodiments of the invention provide an Internet-based design environment, implemented on one or more web servers, for use by building, design, architectural, engineering, and construction personnel, wherein the design environment provides a graphical user interface having a virtual desktop that resembles an architect's desk. The virtual desktop provides a virtual workspace for storing design documents. The virtual desktop also provides a set of basic virtual design tools for use in sketching, drawing, modeling, creating, and editing the stored design documents in the virtual workspace.

The design documents may comprise different media types and are persistently maintained on the web server. The virtual design tools may comprise graphical icons that resemble physical objects with similar virtual functionality to the resembled physical objects and may be moved around the virtual workspace. The design environment supports multimodal input, side-by-side layout of the stored documents, access permissions for users of the design environment, and the ability to interact with applications on the virtual desktop.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for (1) an architectural web site for accessing, manipulating, modifying, creating, and editing architectural information (that is persistently maintained) such as drawings, plans, sketches, etc.; (2) the ability to make one or more copies of a software tool and assign each instance different properties; (3) the ability to add new tools to an application by dragging and dropping the tool; (4) a transparent application window wherein data visible behind the window may be captured and incorporated into a new application; and (5) a notebook-like application that runs on both a PDA and a personal computer. Some of the tools provided may include a scale tool, a ruler tool, a knife tool, a tracing paper tool, and a resize document tool. A composite document that acts as a container for other documents may also be provided. Further, a virtual personal digital assistant (PDA) may be graphically displayed on a desktop computer monitor. Such a virtual PDA may be synchronized with an actual personal digital assistant to maintain the same information.

Information Flow

Figure 1A:
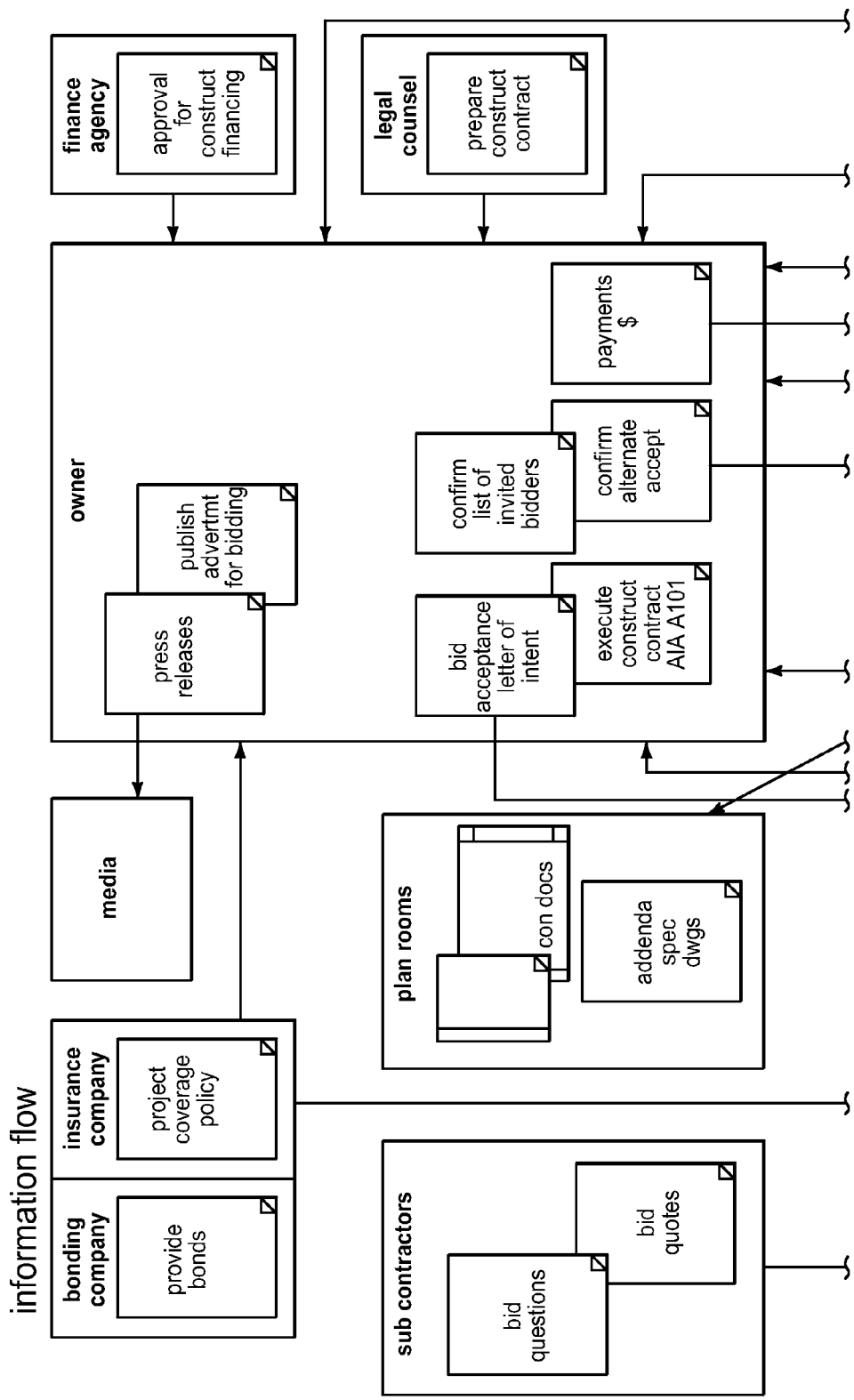
FIGS. 1A-1C illustrate the flow of information between project participants.
Figure 1B:
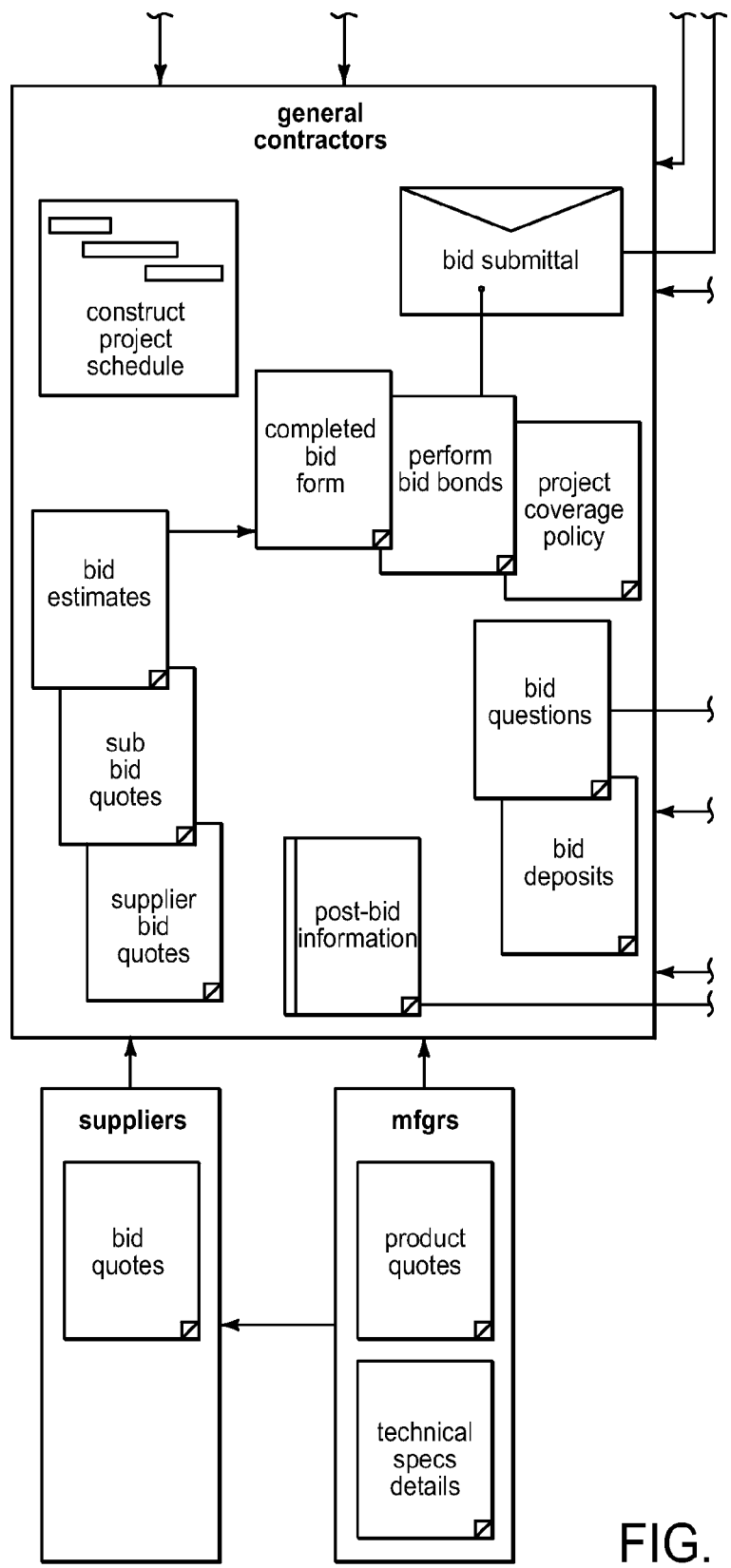
Figure 1C:
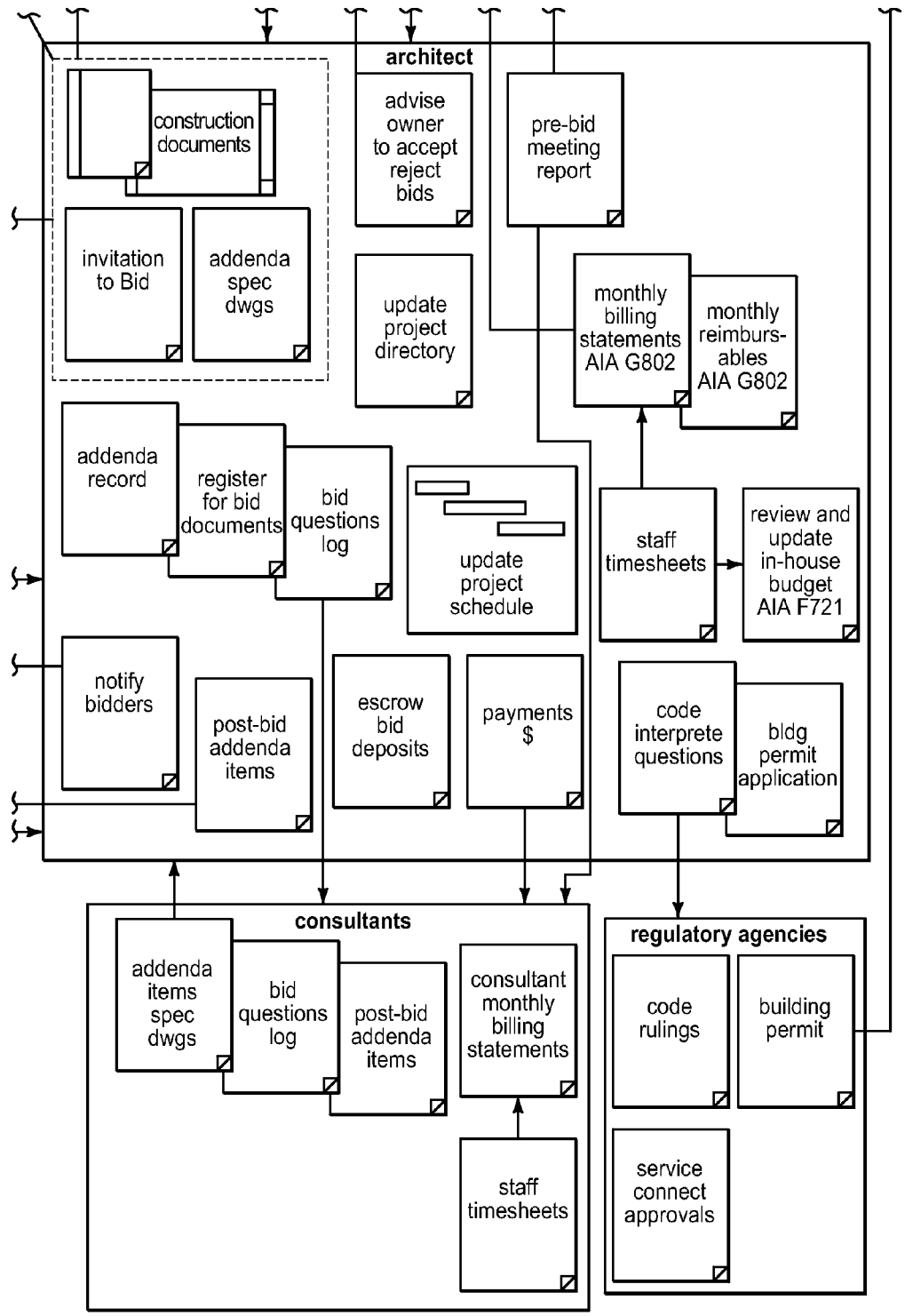

FIGS. 1A-1C illustrate the flow of information between project participants. As described above, with new technology and the increased use of the Internet, project participants often have computers, Internet access, and personal digital assistants (PDAs). As indicated in FIGS. 1A-1C, information (e.g., bids, quotes, plans, payments, permits, questions, documents, etc.) flow between general contractors, sub-contractors, suppliers, manufacturers, owners, insurance and bonding companies, architects, consultants, regulatory agencies, finance agencies, and legal counsel. Such a flow of information is part of the planning process and construction of a project.

Hardware Environment

Figure 2:
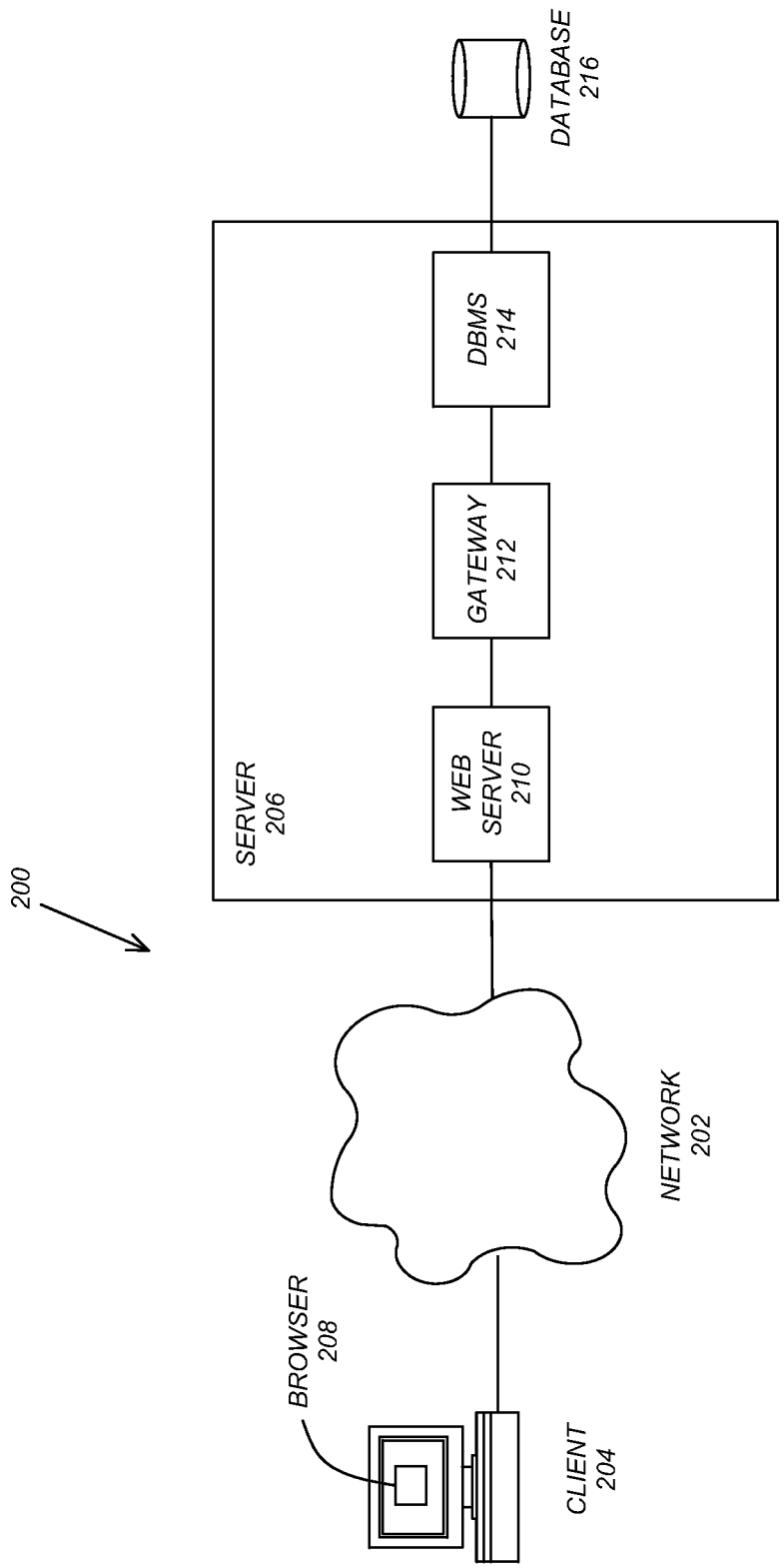
FIG. 2 schematically illustrates a hardware and software environment in accordance with one or more embodiments of the invention.

FIG. 2 schematically illustrates a hardware and software environment in accordance with one or more embodiments of the invention, and more particularly, illustrates a typical distributed computer system 200 using a network 202 to connect client computers 204 to server computers 206. A typical combination of resources may include a network 202 comprising the Internet, LANs, WANs, SNA networks, or the like, clients 204 that are personal computers, personal digital assistants (PDAs), or workstations, and servers 206 that are personal computers, workstations, minicomputers, or mainframes. Further, multiple clients 204 may communicate directly with each other (e.g., a PDA communicating with a desktop or personal computer).

In accordance with one or more embodiments of the invention, the Internet 202 connects client computers 204 executing Web browsers 208 to server computers 206 executing Web servers 210. The Web browser 208 is typically a program such as Netscape's Navigator or Microsoft's Internet Explorer. The Web server 210 is typically a program such as IBM's HyperText Transport Protocol (HTTP) Server or Microsoft's Internet Information Server. In one or more embodiments, the servers 206 may also execute a Common Gateway Interface (CGI) 212 that interfaces between the Web server 210 and a database management system (DBMS) 214.

Generally, these components 208, 210, 212, and 214 all comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Software Embodiments

One or more embodiments of the invention provide a mechanism for utilizing digital technologies (like pen-based computing and the Internet) for the architectural design community. A design desktop is comprised of a graphical/digital work environment that resembles a physical desk where references to physical objects may be used and manipulated. The design desktop includes a built-in set of sketching and 3D tools that enable conceptual design. For example, a user may select a pen and draw on tracing paper that is placed over a blueprint. Further, support for multi-modal input, side-by-side layout capabilities, multiple levels of ambiguity, and collaboration tools for design and presentation may be provided. Embodiments of the invention are web-based and accessed using an Internet browser. Additionally, geometry may be tagged with links to non-geographical data.

To enable sketching, drawing, and modeling, pen-based design tools may be used to create/draw concept sketches, and study models and diagrams. The pen-based tools may be used by obtaining pen-based input for the 2D & 3D sketching, drawing, and modeling. However, the use of a pen is not required. For example, a mouse can also be used.

As described above, users may be linked through the Internet, wherein the database containing the information may be stored on a server accessible (from anywhere) twenty-four (24) hours a day. Such embodiments work locally and communicate globally. Web-based information databases and online tools may be used. Further, modularity and scalability are enabled such that the invention will work over the net on a desktop, through a local intranet, and eventually on a PDA or handheld device.

One or more of the following advantages may be provided towards a new digital architecture:

(1) Virtual digital tools may enable architects to get back to the business of designing great buildings. Instead of forcing architects to modify their practices to try to work with a stream of new software releases, embodiments provide virtual tools that are simple, straightforward, and accessible.

(2) Designers are allowed to control the technology. The reliance on non-architects to understand what architects do and how they do it is removed.

(3) Sketching with ambiguity and pen-based input for use into the digital design process may be an integral part of the software, thereby keeping drawing and artistic expression alive.

(4) Architects are reconnected with the design process by enabling architects that are not trained in computer aided design (CAD) to participate fully in the design process again.

(5) The power of new technologies is taken advantage of in order to advance the profession and the environment. For example, better communication utilized may lead to better design and better buildings thereby improving the building environment.

One or more mechanisms/areas may be utilized on a web site. A variety of different types or differently structured/organized web sites may be provided.

Figure 3:
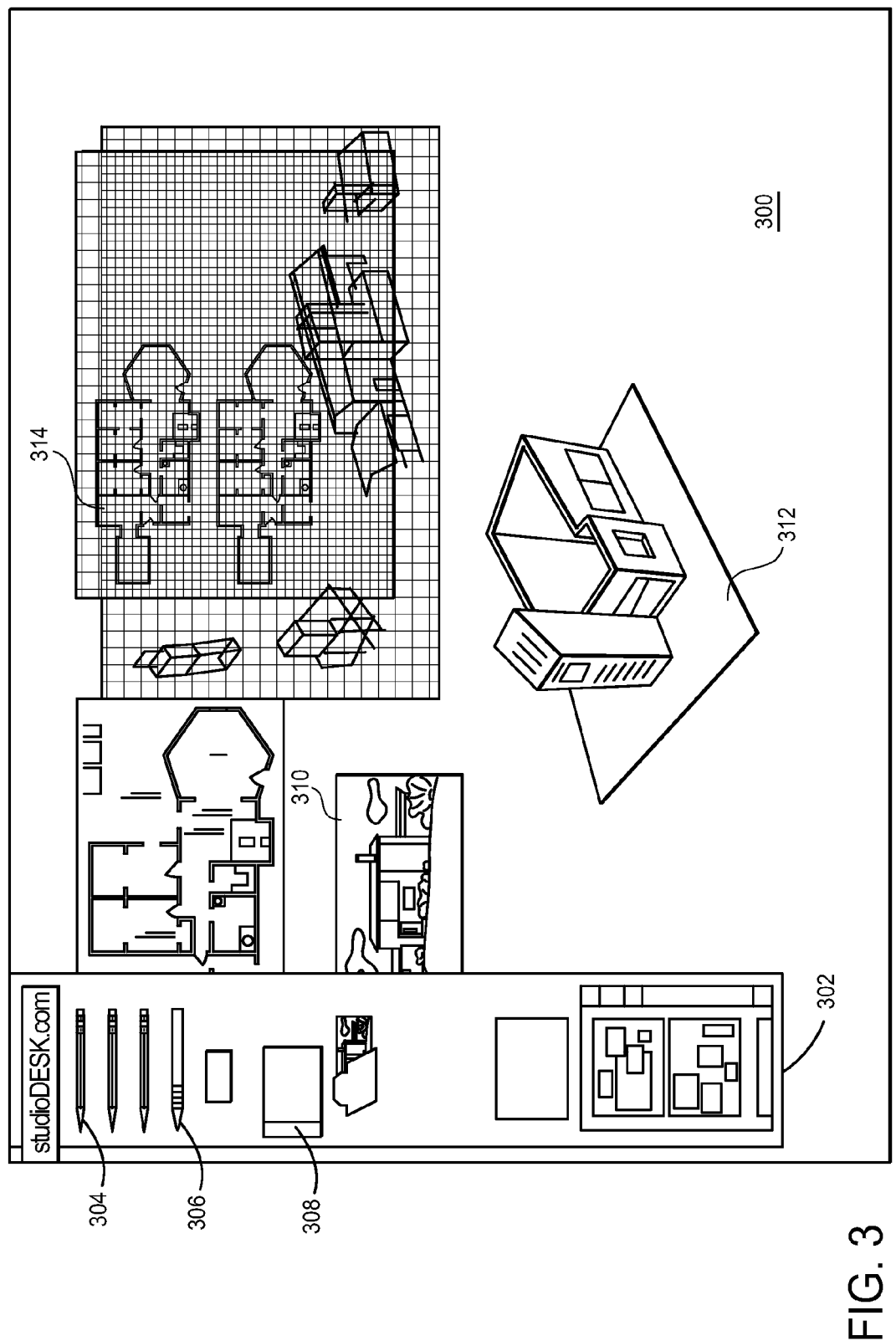
FIG. 3 illustrates a desktop in accordance with one or more embodiments of the invention.

FIG. 3 illustrates the desktop in accordance with one or more embodiments of the invention. The desktop provides the user with an area to work 300 with pen-based input for sketching, drawing, and 3D modeling. The desktop is comprised of a virtual work space area 300 and a toolbar 302. Toolbar 302 may contain one or more basic drawing tools for working in drawing space 300. For example, a pencil 304, pen 306, or tracing paper 308 may be supplied in toolbar 302 to utilize and create sketches, drawings, and 3D models in virtual drawing space 300. In virtual drawing space 300, the user may move pictures 310, models 312 or may create and modify drawings 314. Further, each of the objects in drawing space 300 may be moved around or hidden by the user (similar to a physical desk).

As described above, embodiments of the invention (hereafter referred to as a "web site" or "Studiodesk™") may make an architectural web site/application/database available to users. Studiodesk™ provides the ability to store and access plans, drawings, sketches, etc. Access permissions can be defined to provide access for those persons working on a project such as architects, contractors, interior designers, structural engineers, etc. Additionally, information in Studiodesk™ (such as drawings, plans, etc.) may be edited and modified in real time using a Studiodesk™ application (by a person with proper access permissions) using simple easy to use tools. Further, Studiodesk™ provides the ability to interact with other applications on the desktop including transferring information to Studiodesk™ (or a web site provided by Studiodesk™) from the desktop (and vice versa), and using related programs in both Studiodesk™ and the desktop at the same time.

Notebook-like applications may also be provided and available to a user. Such applications provide a similar interface on both a personal digital assistant (PDA) and a personal computer (PC). Information may be dragged and dropped into the notebook on the PC and will automatically be available on the PDA version (after synchronization) and vice versa. On the PC, the notebook floats in a window above all other applications and can be used as a graphical clipboard to transfer/associate data between applications. Further, a notebook on the PC may be a full-fledged virtual PDA. In addition to providing the functionality and graphical user interface of a virtual PDA, support for additional PDA-like applications such as spreadsheets, to-do-lists, calendars, etc. may also be provided. Thus, a virtual PDA that can be moved and synchronized with a web site, local computer, and actual PDA may be utilized.

One or more copies of a software tool (e.g. a pen) may be obtained. Thereafter, each instance may be assigned different properties (e.g. color, line thickness). A custom set of tools tailored to a particular task may be created. For example, a user can create a set of three colored pencils, instead of having only one pencil and continually changing its color back and forth, as in current applications.

New tools may be added to an application by dragging and dropping one or more tools from a website onto the application. Such tools might be charged for on a per-tool basis, or by subscription, or by leasing, or by offering a free trial period with an option to buy. Further, such tools may be created in the form of an applet. Thus, items can be represented digitally and manipulated by the applet tools in real time. For example, an applet tool may be created to select a particular point on a wall and dragging the point such that the entire wall is raised or lowered. Another tool may consist of a knife (or cutting tool) that may be used to cut away sections/portions of a model or objects of a model such as a wall or ceiling.

The background of the application window may be transparent such that other applications may be viewed behind the window on the PC display. In essence, a transparent window enables the use of virtual tracing paper that provides the ability to overlay several independent documents while maintaining transparent capabilities/properties of each document. Data visible behind a transparent window may be captured and incorporated into an application, where the data can be annotated and otherwise manipulated as a bitmap image. Thus, the transparent window may be used to trace over an item in the background. In accordance therewith, a plan may be displayed in the background, a transparent window may be placed over the plan, and an architect may trace modifications to the plan or variations of the plan for discussing with other persons such as the client or contractor. Further, the transparent window may be a window of an Internet browser. In accordance therewith, the Internet browser may be modified or the properties of the window may be configured to permit the transparency and tracing capabilities.

Information may be stored locally when a user is not connected to the Internet. However, once the user connects (or logs into the web site), the information may be stored remotely on the web server. By storing information in this manner, synchronization between multiple parties accessing the web site is accomplished more easily. Further, while connected to the internet, multiple users at different locations may have the ability to access and edit workspaces and documents simultaneously, while seeing each other's edits as they are made.

Specific Embodiments

Figure 4:
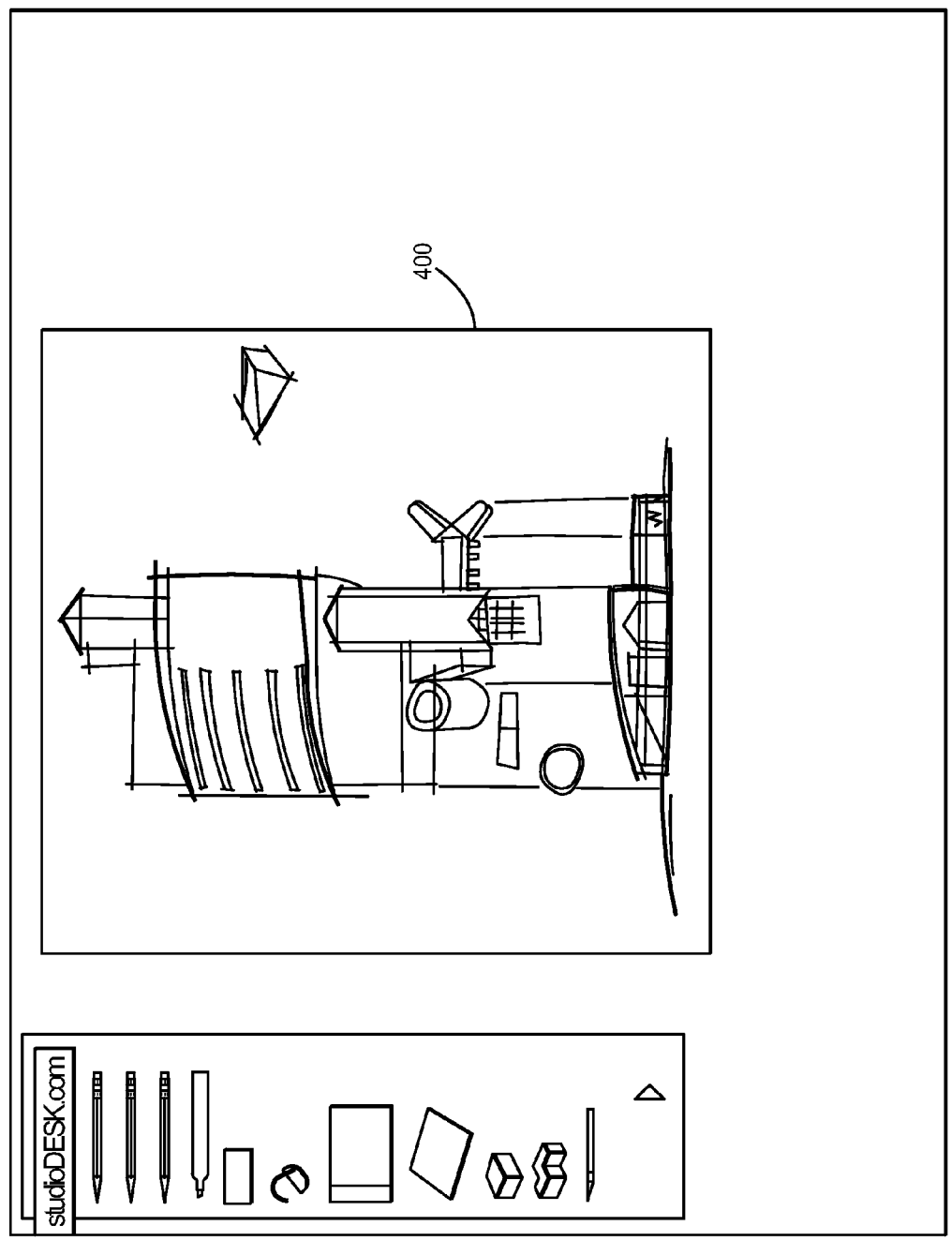
FIG. 4 illustrates the creation/editing of a sketch in a virtual desktop in accordance with one or more embodiments of the invention.
Figure 5:
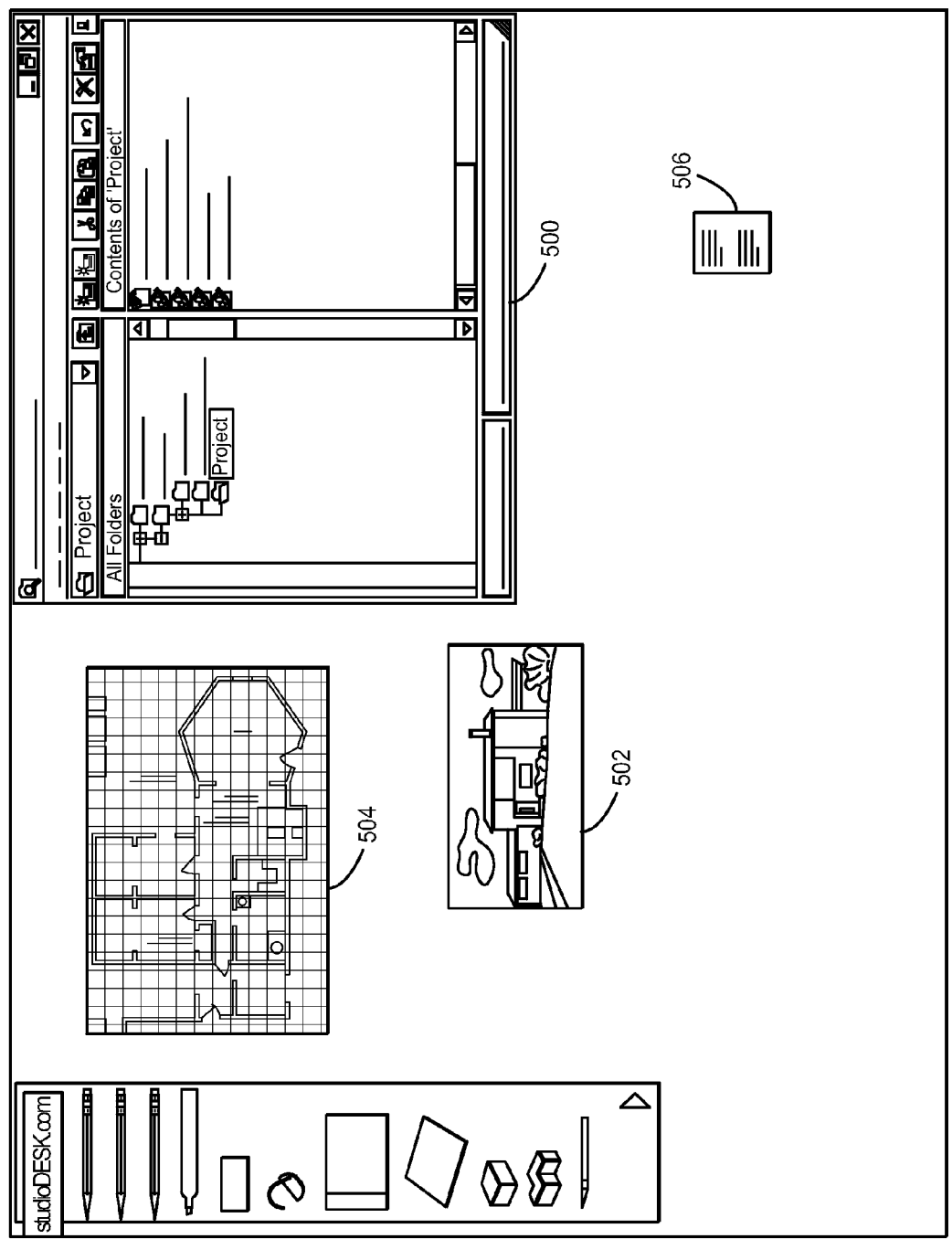
FIG. 5 illustrates a virtual desktop in accordance with embodiments of the invention.

A web-based architectural design environment referred to as STUDIODESK™ or virtual desktop may be provided. On the virtual desktop, a designer can create, edit, view and manipulate design documents, including sketches, hard-line drawings, models, images, schedules and specifications. FIG. 4 illustrates the creation/editing of a sketch 400 in a virtual desktop. Documents and data are stored on a web-server, so that project data can be accessed anywhere. The environment and user interface may be optimized for pen input, although a mouse, trackball, or other input device may also be used. FIG. 5 illustrates a virtual desktop in accordance with embodiments of the invention. As illustrated in FIG. 5, other applications such as the Explorer application 500 may interact with and run simultaneously with the virtual desktop. For example, a file identified in the Explorer application (e.g., a picture 502, plan 504, or notes 506) may be dragged and dropped onto the virtual desktop.

Instead of attempting to automate the architectural process, a virtual desktop provides a set of fundamental and powerful tools that, in the hands of a skilled user, can be used to realize and document architectural designs. The user acquires and arranges their own custom set of tools to suit their tasks and work habits in the virtual desktop. Data objects and structures are kept simple and close to the surface, giving the user maximum control and flexibility. It is left to the user to impose meaning on the data, at the appropriate level of abstraction.

Structure of a Project

Figure 6:
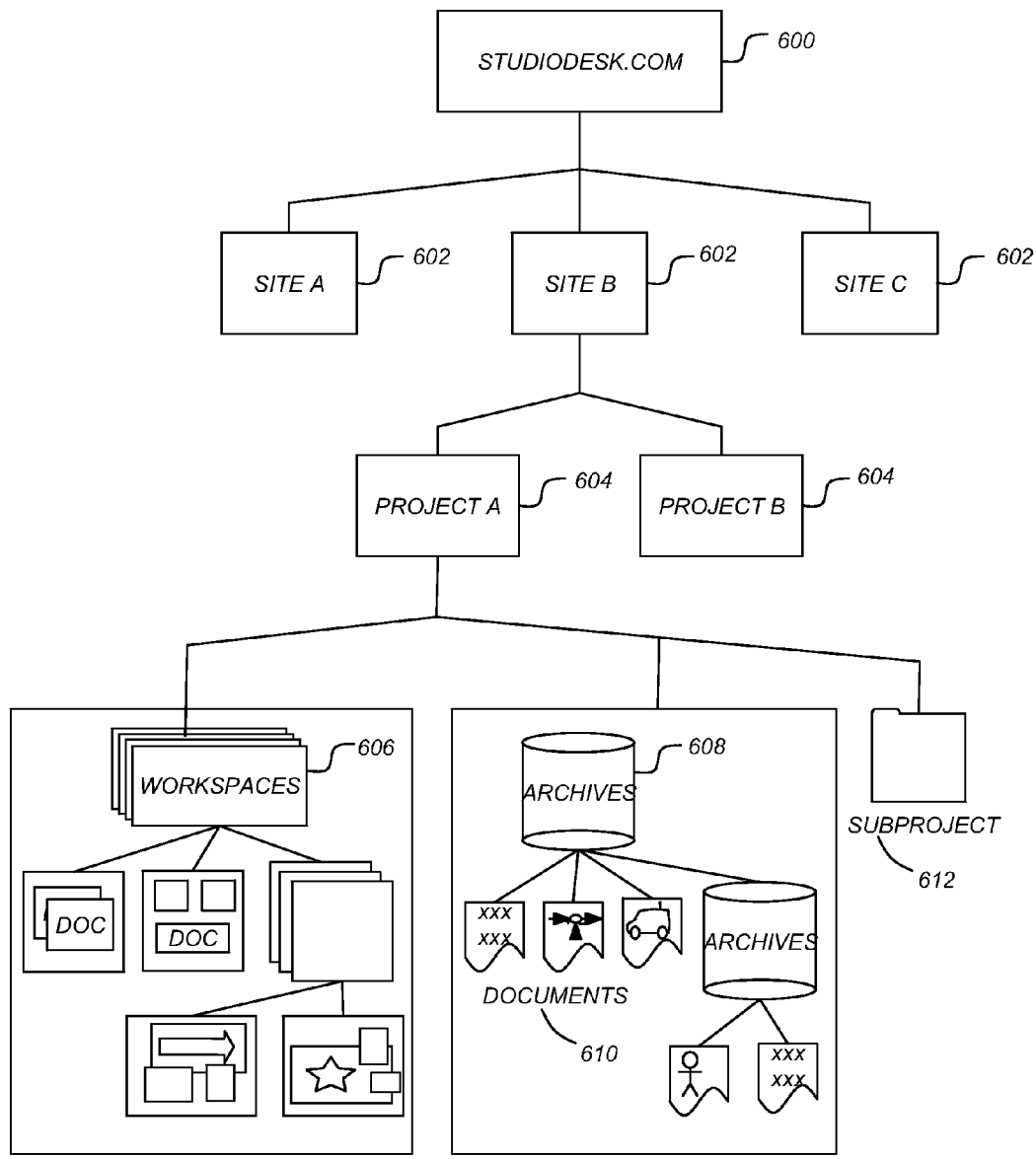
FIG. 6 is a diagram illustrating the components of a project in accordance with one or more embodiments of the invention.

FIG. 6 illustrates the structure of a system in accordance with one or more embodiments of the invention. The STUDIODESK™ software 600 consists of various sites 602 made up of projects 604. A project 604 consists of documents held on a server. These include all the sketches, drawings, models, program notes, specifications, schedules, video, audio, photographs and other digital information used to design, specify and manage the project. Users access the project documents through the virtual desktop running in a web browser. The documents are organized into a hierarchy of sites 602, projects 604, workspaces 606, archives 608, and documents 610.

Sites 602

A site 602 is a collection of projects 604. A site 602 corresponds to the organization managing the various projects 604. For example, an architecture firm "A" may have a site 602 called "A" on a web server. Site "A" contains projects 604 managed by "A".

In addition to containing projects 604, a site 602 can have a collection of workspaces 606 and an archive 608. In this sense, a site 602 is really no different than a project 604. A site 602 is given a special name just to clarify its role in representing the real-world organization managing a collection of projects 604.

Projects 604

Under a particular site 602, workspaces 606 and documents 610 are organized into projects 604. Each project 604 may have its own URL. A project 604 is like a folder. A project 604 can contain workspaces 606, document archives 608, and other projects 612. For example, a firm like "A" might have a single project 604 called "A". This project 604 might contain sub-projects 612 for individual buildings. If it makes sense, each building project 612 could be divided into sub-projects 612.

Projects 604 (and sites 602) control access to their content. Each project 604 may have an access control list (ACL) that lists the users who are allowed to access the project 604 contents and the level of permissions for each user. Permissions may be inherited but can be overridden by sub-projects 612 or individual documents 610 at any level. The default is to provide open access. Restricting access may require a deliberate action by an owner.

Workspaces 606

Figure 7:
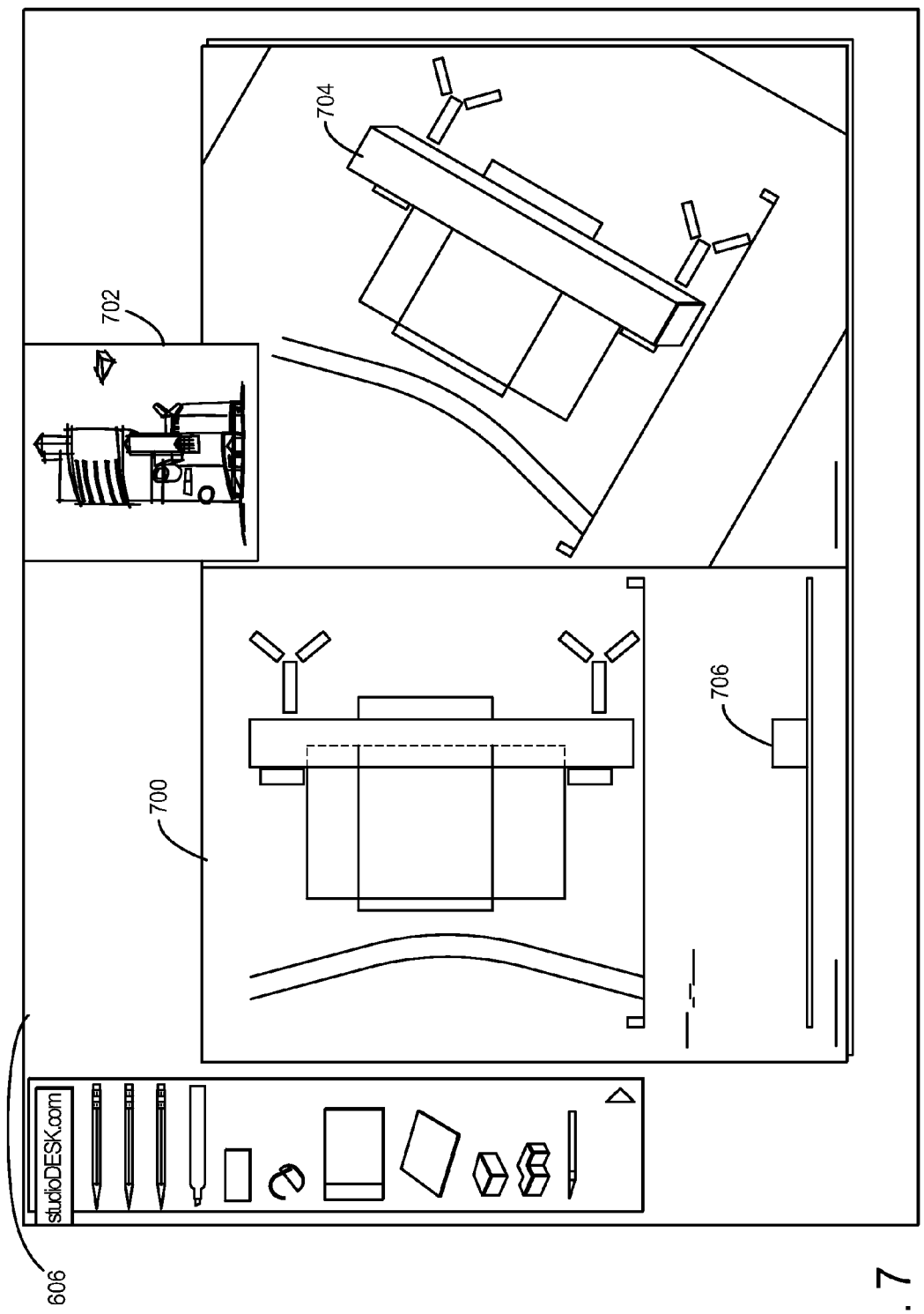
FIG. 7 illustrates multiple documents/files on a project workspace in accordance with one or more embodiments of the invention.

A workspace 606 is a container document that may be directly edited. A workspace 606 contains links to project documents 610, displayed graphically on the workspace 606 surface, including 2D drawings, 3D models, images, notebooks, word documents, spreadsheets, etc. FIG. 7 illustrates multiple documents/files on a project 604 workspace 606 in accordance with one or more embodiments of the invention. The key function of the workspace 606 is to allow a user to organize documents 610 visually. A user can place documents 610 side by side for reference, or superimpose them like tracing paper.

A user can create any number of workspaces 606. Each workspace 606 may have its own URL. The state of each workspace 606 is persistent such that when the user returns to a particular workspace 606, the documents 610 the user was working on in the workspace 606 will be opened in the position that the user left them.

Documents 610

Referring to FIG. 7, the actual data that a user creates, edits and views is contained in documents. A user can access one or more documents by placing the desired document on a workspace 606. Examples of such documents include 2D drawings 700, 702, and 704, 3D models 704, images, notebooks, word processing documents, spreadsheets, videos, audio recordings, digital photographs, or any other type of multimedia document. As illustrated in FIG. 7, numerous view of the same model/drawing may be displayed simultaneously. For example, view 706 illustrates a side elevation view of model 704. View 700 also illustrates a top view of the same model. Further, FIG. 7 illustrates the creation/modification of a document in a workspace. For example, a user may identify a point on a wall or ceiling of model 704, and drag the point up to raise/lower the ceiling. Various shapes and tools may be used to work with documents as described below.

The same documents can be opened in more than one workspace 606 at the same time. If both users have edit permission, both may edit the document at the same time.

Accordingly, referring back to FIG. 6, documents 610 contain the actual project 604 data, including designs, construction drawings, specifications, etc. The goal is to provide access to the data contained in the document 610 as immediate and direct as possible. Borders and widgets framing a document 610 may be minimized. Further, tool actions apply to whichever document 610 is under the tool.

Every document 610 in the workspace 606 may have a title bar at the bottom that shows the document 610 name and contains icons for document 610 related commands. A user may drag a document 610 by the document's 610 title bar to reposition the document 610 in the workspace 606. A document 610 may also be resized by dragging a corner or edge. Such a resizing may enlarge a document's 610 size without scaling an image in the document. Dragging by a graphically differentiated corner of the document 610 may resize the document 610 and scale or zoom its contents at the same time.

Document 610 related commands are accessed through icons on the title bar or a pop-up menu accessible through the document's 610 title bar. Such commands may include "Close document", "Minimize", "Print", "Export", "Send", "Cut", "Copy", and "Paste". A document 610 title bar may also contain special commands that only appear for a certain type of document 610, e.g. "Forward" and "Back" for a web document 610 or "Layers" for a layer stack.

Documents 610 may interact with and be layered on top of each other. In one or more embodiments, Studiodesk™ defines interfaces for each document 610 that allows the document 610 to retrieve information from another document 610. Such retrieved information may include a scale that allows documents 610 to scale appropriately to each other, an origin that allows documents 610 to be positioned so that their contents align correctly, and geometric snap information that allows geometry being drawn in a document 610 to snap to geometry in another document 610 under the first document 610.

The draw order of documents 610 on a workspace 606 may be changed using a "Draw Order" tool. Other document properties that may be viewed and/or edited may include Title, Author, Creation Date, Color, Transparency, Scale, Grid Resolution, etc. Such properties may be edited using a property sheet accessible from a document 610 pop-up menu (or possibly from an icon on the title bar).

Various document 610 types may provide different functions and capabilities to a user. In accordance with one or more embodiments of the invention, the following document 610 types may be utilized:

(1) 2D paper—A document 610 used for creating and modifying two dimensional (2D) drawings (e.g., a sketch, hardline, etc.). Properties for 2D paper may include a variable transparency, scaling capabilities, zoom capabilities, resizing capabilities (e.g., by dragging a vertical or horizontal edge to add more paper), rescaling capabilities (e.g., by dragging a corner to re-scale/resize the drawing), and importation capabilities (e.g., DWG files may be imported into the virtual desktop 900 drawing format).

(2) 3D modeling sheet—A document 610 type used for creating and modifying three dimensional (3D) models. Multiple 2D and 3D views may be shown/viewed at the same time.

(3) Notebook 912—A document 610 type that provides a container for workspaces 606 that allows a user to flip through the workspaces 606 similar to pages of a notebook. Since each page of the notebook 912 may comprise a workspace 606, the notebook 912 may contain any combination or arrangement of documents 610.

(4) Layer stack—A document 610 type that provides a container for workspaces 606. A layer stack is similar to a notebook 912, but the pages may be transparent. A layer stack may be used to create the equivalent of a layered drawing. Since each layer is a workspace 606, the layer stack may contain any combination or arrangement of documents. A layer stack may also be referred to as a container or composite document 610. As described, such a composite document 610 may provide for graphically associating multiple documents of various document/media types. Further, such a composite document 610 may be moved between two or more workspaces 606 as a unit using a graphical user interface.

(5) Other workspace 606—A document 610 type that provides a graphical link from one workspace 606 to another workspace 606.

(6) Web page—A document 610 type that may be viewed in-place on the workspace 606 via a browser 208 of FIG. 2. A web page may provide basic web-browsing commands in a title bar.

(7) Non-native documents 610—A document 610 type that represents documents 610 created in a foreign program (e.g. Word, Excel, etc.). A non-native document 610 may be viewed in the virtual desktop 900. Editing may be similar to embedded or container objects provided using component object model (COM) or object linking and embedding (OLE) technology. For example, when a user selects/clicks "Open" or double-clicks the document 610, the appropriate application opens in its own window.

Archives 608

When a document 610 is first created in a workspace 606, it may only be accessible through that workspace 606. If a user deletes that workspace 606 from the project 604, the document 610 may also be deleted. A warning message may be displayed informing the user of the deletion of the document 610.

For longer term storage, a user can place documents 610 in an archive 608, that lets the user organize documents 610 hierarchically in folders. Once a document 610 is placed in an archive 608, the document 610 continues to exist in the project 604 even if the document 610 is not open in any workspace 606.

Subsequently, if a user places an archived document 610 back into a workspace 606, the document 610 as it appears in the workspace 606 is a link to the document 610 in the archive 608, and any edits the user makes apply to the original archived document 610. A user can explicitly create a new copy of a document 610 if the user doesn't want to modify the original, or the user can open a document 610 read-only so that it can't be modified. An archived document 610 can be opened on more than one workspace 606 at a time. The archive may provide check in/check out, versioning, history, and other standard document management functions.

Web Site Embodiments

To access project 604 documents 610, a user may first enter a portal web site 602. However, the user can also start the application by clicking on an icon on a PC desktop without going to a web site. In addition to providing access to a user's project 604 documents 610, the web site 602 may contain a wide range of information related to digital design.

Figure 8:
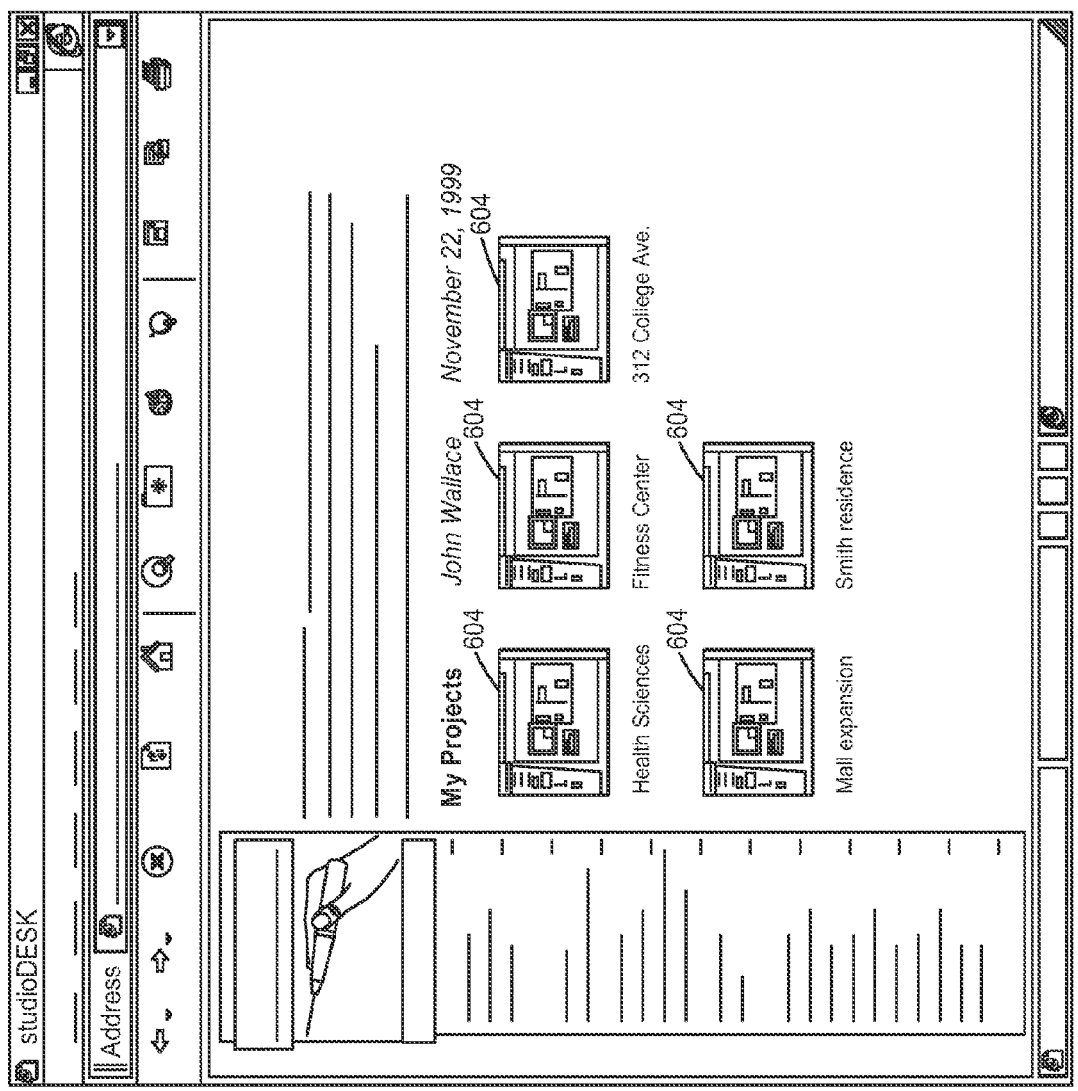
FIG. 8 illustrates a mockup of project listings in accordance with one or more embodiments of the invention.

A user may navigate to a page containing a list of projects 604 in which the user is a participant. Each project 604 may be represented by a thumbnail image. Clicking on a project 604 may bring up that project 604 on the virtual desktop. Normally, projects 604 will have access control and a user will be asked to enter a username and password. This login may be the same for all projects 604 and may only have to be entered once per session. Subsequent to login, the web site of FIG. 8 may be displayed. FIG. 8 illustrates a mockup of project 604 listings in accordance with one or more embodiments of the invention. The web site of FIG. 8 may allow the user to select one of the projects 604 in a user's account.

Figure 9:
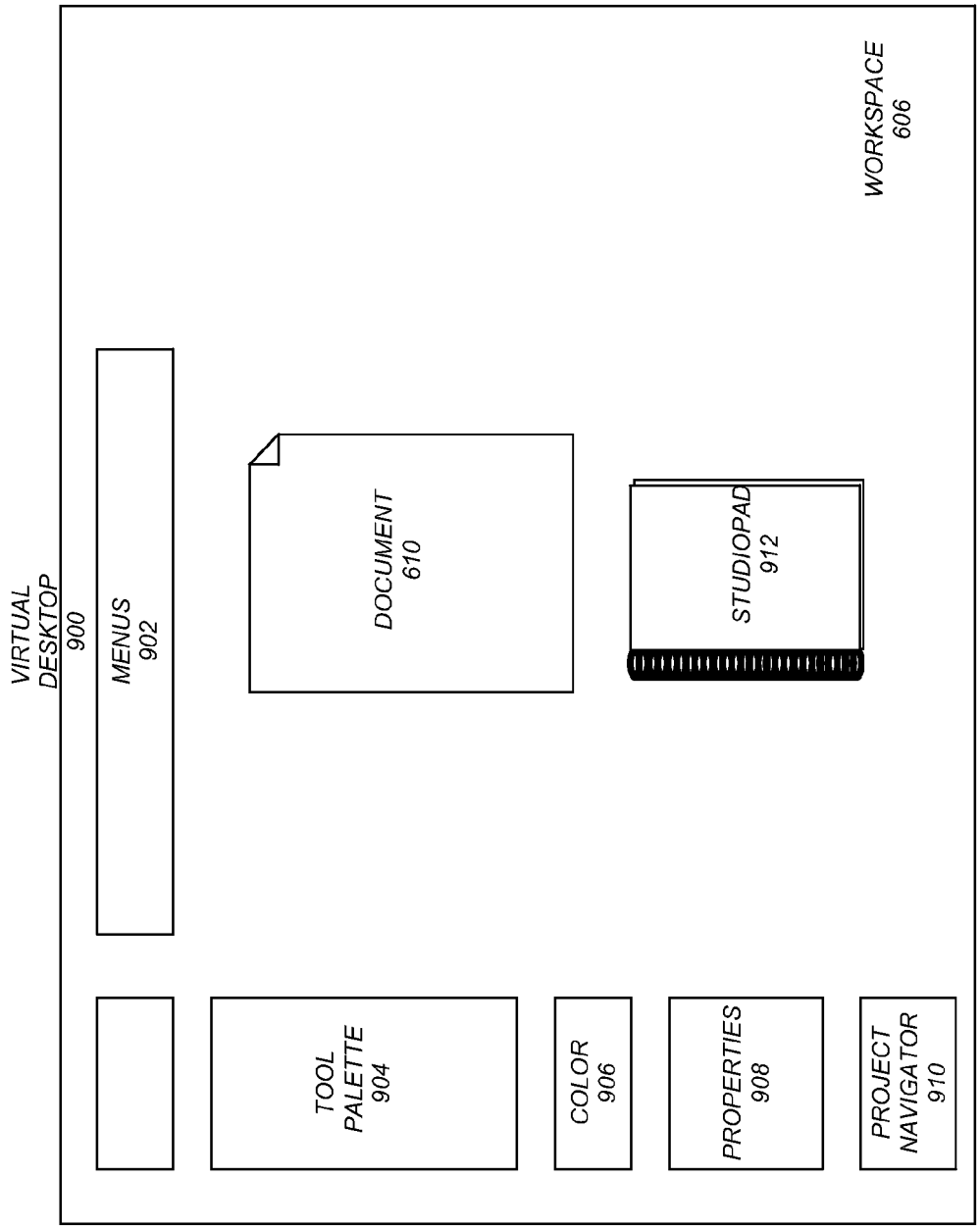
FIG. 9 illustrates the basic components of an architectural environment in accordance with one or more embodiments of the invention.

When a user clicks on a project 604 on the web site, a virtual desktop will start up inside a browser 208 window of FIG. 2. FIG. 9 illustrates the basic components of an architectural environment/virtual desktop 900 in accordance with one or more embodiments of the invention. The virtual desktop 900 gives the user a graphical view into a project's documents 610, along with tools to create, edit and view the documents 610. Menus 902, tool palettes 904, color editors 906, and property editors 908 surround a large workspace 606. Documents 610 displayed in the workspace 606 contain project data.

Further, as described above, when connected to the Internet or web site 602, multiple users may access and edit workspaces 606 and documents 610 simultaneously. For example, multiple users at different locations may access and edit a workspace 606 or document 610 at the same time, while seeing each other's edits as they are made.

Tools

Tools are objects that a user can use to create and edit project documents 610. Tools may include objects such as pens, erasers, rulers, etc.

Tools may be provided that function to reduce the complexity of a user interface. Accordingly, instead of presenting the user with a large fixed set of tools covering all the tasks a user might possibly want to accomplish, a set of tools tailored to a user's specific tasks may be assembled. When a user first opens a virtual desktop 900 or workspace 606, the workspace 606 may contain only a few basic tools that may be provided in a tool palette 904.

A user can add more tools by clicking on a "More Tools" command in a "Tools" menu 902 that may provide a user with an on-line catalog of tools. Using the catalog, a user may drag and drop a new tool into the virtual desktop 900 (or the virtual desktop toolbar), workspace 606, or tool palette 904 and start using the new tool immediately.

Figure 10:
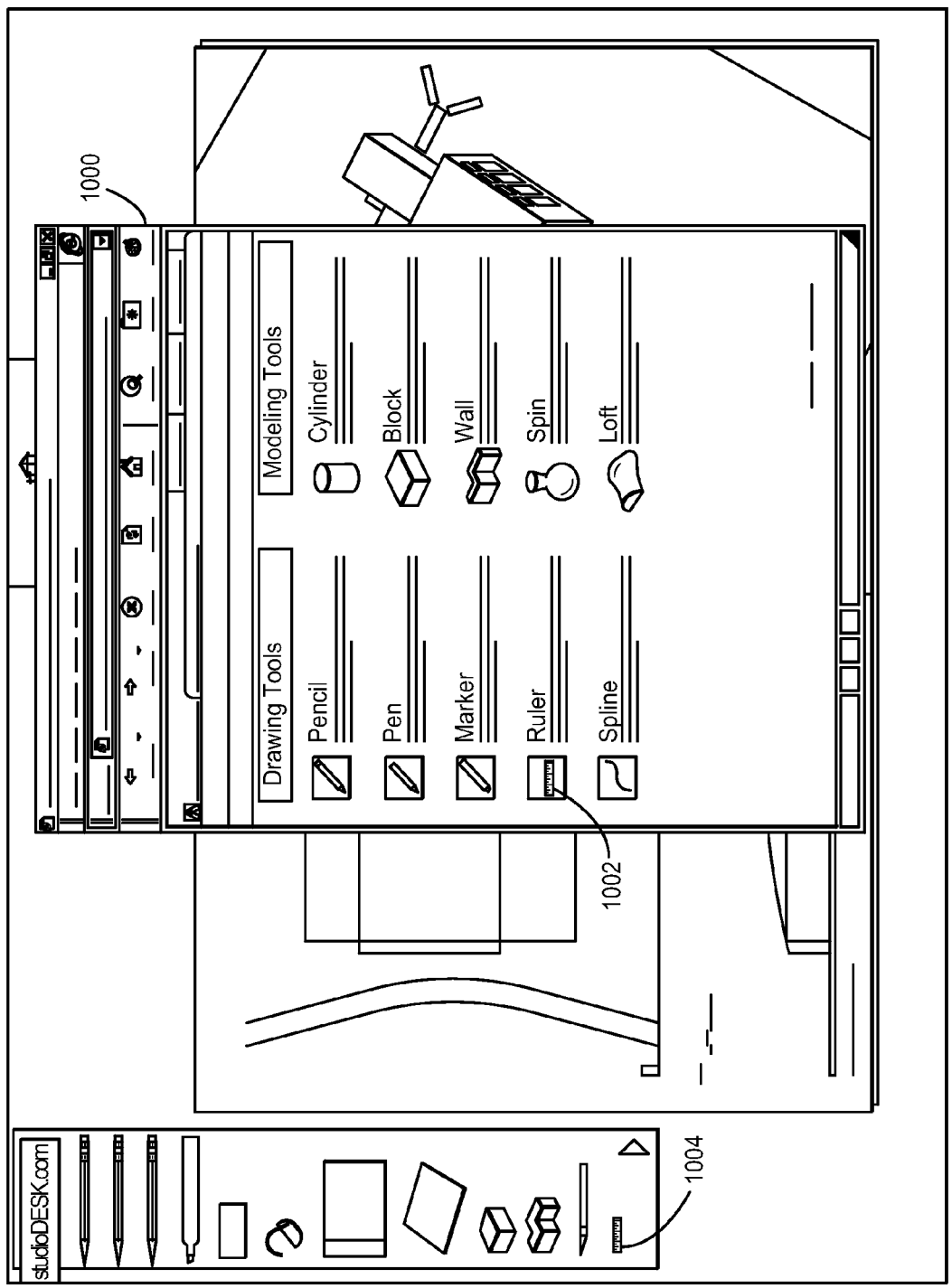
FIG. 10 illustrates the addition of a tool from a web site in accordance with one or more embodiments of the invention.

FIG. 10 illustrates the addition of a tool from a web site. Web site 1000 contains multiple tools that may be selected. To utilize a tool from web site 1000, the user merely selects a tool such as ruler tool 1002 (that assists a user in drawing a line and displays a unit of measure (e.g., inches)), drags the selected tool to the toolbar (also referred to as tool palette 904) and drops the tool on the tool palette (e.g., ruler tool 1004 on the toolbar).

Tools are objects and have properties. For example, a pen may have a color and line weight. Referring back to FIG. 9, a user may change the pen color using a color control 906. A user can also create additional instances of a tool by copying it. For example, if a user's work involves moving between a red, blue, and black pen frequently, a user can make two additional copies of a black pen tool and set their colors to be red and blue.

Tools maintain their functionality and work across documents 610. For example, a pen tool will draw a 2D stroke on a 2D drawing document 610. The same pen will draw onto the surface of a 3D model, or onto a 3D workplane. The data created by the tool depends on the context in which it is used, i.e., what the pen is drawing on.

Tools are placed on a tool palette 904. Tools can be placed anywhere on the palette 904, simply by dragging and dropping them. A user can stretch the palette 904 to accommodate new tools. The palette 904 can also be sized so that only a portion of the tools are visible, in which case forward and backward buttons allow the user to quickly navigate through the tools on the palette 904. There can be multiple tool palettes 904. New tool palettes 904 may be created by the user as needed. Tools can be copied and moved between palettes 904.

Tools may not need to be placed on the palette 904 prior to use. Additionally, objects instead of tools may be utilized to provide various elements of a document 610. For example, a wall object, window object, sunroof object, plant object, etc. may be placed and utilized in a document 610.

Figure 11:
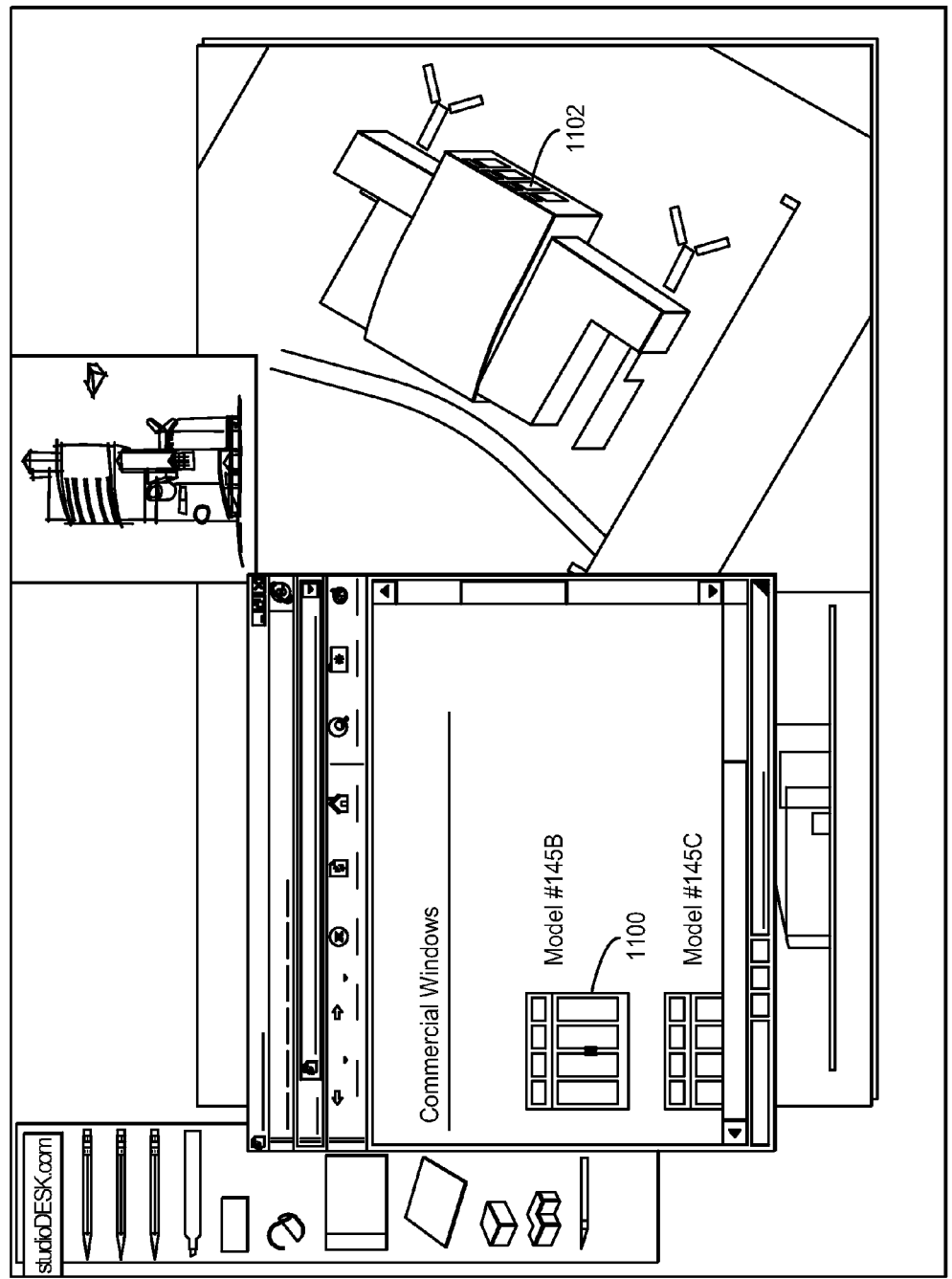
FIG. 11 illustrates the real time retrieval and use of an object in accordance with one or more embodiments of the invention.

FIG. 11 illustrates the real time retrieval and use of an object in accordance with one or more embodiments of the invention. The user may browse to a web page that has various objects available such as door object 1100. As illustrated in FIG. 11, a door manufacturer may maintain a web site with various doors that are offered by the manufacturer. As provided by the manufacturer, the online representations of the doors may be objects with properties that enable the door to be used. A user merely selects door object 1100, drags the door object to the appropriate location, and drops the door on the drawing/model. Based on the properties, the window may be reoriented (as in door 1102) so that it accurately reflects the placement in the model or drawing. Alternatively, the door may be dropped onto the toolbar for additional use.

Menus 902

Referring back to FIG. 9, a menu bar 902 across the top of the virtual desktop 900 contains drop-down menus. The drop-down menus contain commands. Unlike tools, commands may be modeless, one-shot operations, often applied to a selected object. The menus 902 are customizable, and new commands may be plugged in. The menu bar 902 can be positioned anywhere on the desktop by the user.

The following table illustrates the menu and drop-down menus that may be available:

| Project | Edit | View | Tools | Draw | Help |
|---|---|---|---|---|---|
| New Workspace 606 | Undo | Tool Palette 904 | Duplicate Tool | Flip Horizontal | Help Topics |
| Insert From File | Redo | Color | Remove Tool | Flip Vertical | |
| Export | — | Line Thickness | Restore Tool | Scale | |
| Print | Cut | Transparency | More Tools . . . | Invert Color | |
| Send | Copy | Details | | | |
| Workspace 606 Properties | Paste | Stencil | | | |
| | Delete | Workspace 606 Browser | | | |
| | — | Project Browser | | | |
| | Select All | Archive Browser | | | |
| | Select None | Notebook 912 | | | |

Property Editing

Properties 908 are attributes that define the appearance and behavior of a particular instance of an object in the system. Examples include color, name, transparency, width, etc. Tools, documents 610, geometric entities, etc. all have properties 908.

Commonly used properties 908 like color, pen width and transparency may be edited using special purpose controls (e.g., color window 906) that float over the workspace 606. Property 908 controls may also be accessible from a properties sheet, that may also float over the workspace 606.

Property sheets show the properties of an active tool. Additionally, if the active tool is the selector tool, the property sheet may display the properties of a selected object.

Project Navigation

While using embodiments of the invention at a particular workspace 606, users may need access to other parts of a project, including other documents 610 or other workspaces 606. Accordingly, embodiments of the invention may provide several tools (e.g., a project navigator 910) for navigating the project hierarchy. Such tools may display both textual information and graphical thumbnails.

Project Browser

For general access to an entire project hierarchy, a project browser window may show a tree view of the project. A user may access all workspaces 606, archives, and documents 610 using this view. A user may also navigate to any project in which the user is a participant.

Workspace 606 Browser

For quick access to a user's workspaces 606, a workspace 606 browser window may show a scrollable list of all of a user's workspaces 606 (across all projects). The user may select/click on a workspace 606 in this list to jump directly to that workspace 606.

Archives Browser

For access to documents 610 in the archives for a current project, an archives browser window may show a hierarchical view of an archive. A user may drag and drop documents 610 from one or more archives to the workspace 606 to edit or view them. Additionally, a user may drag and drop documents 610 from the workspace 606 to the archives to store them.

Direct Viewing of Project Folders

The desktop can view a project folder 604 as well as a workspace 606. A project folder 604 may show icons and thumbnail images representing the folder and workspaces 606 contained in that folder 604. Clicking on an icon or thumbnail may open that folder 604 or workspace 606 for viewing and editing. In addition to containing icons and thumbnails, a folder 604 view can also be drawn into and otherwise modified just like a workspace 606. Options may be provided for organizing icons and thumbnails into various arrangements: alphabetical, by date, etc.

Virtual Notebook

Figure 12:
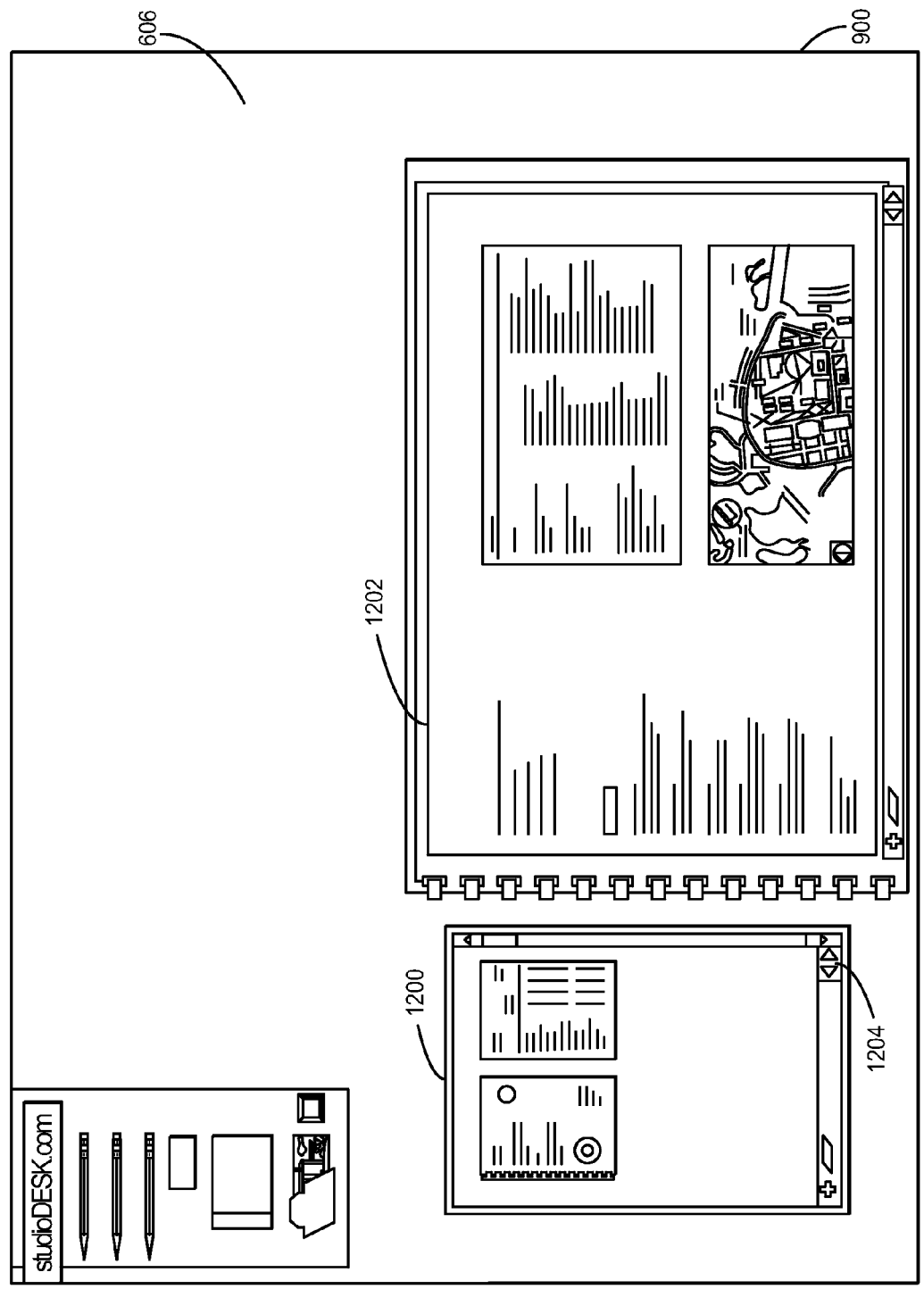
FIG. 12 illustrates the use of a virtual notebook in accordance with one or more embodiments of the invention.

One or more embodiments of the invention provide for a virtual designer's notebook that floats above the virtual desktop 900. FIG. 12 illustrates the use of such a virtual notebook 1200. A user can drag and drop data in both directions between the virtual notebook 1200 and the virtual desktop 900. For example, as illustrated in FIG. 12, a user can drag the document 1202 from the virtual desktop 900 and drop the document to the virtual notebook 1200. A user can use a virtual notebook 1200 similar to a graphical clipboard when browsing for data or when transferring data or documents between workspaces 606. Each page in the notebook 1200 is a workspace 606 document and can contain any data that can exist in/on a virtual desktop 900 or an environment provided in accordance with one or more embodiments of the invention. Another workspace 606 may be examined by selecting a virtual button 1204 that moves to the next workspace 606 in the notebook 1200.

A virtual notebook 1200 may run on any operating system available for hand held computing devices (PDAs) such as the Palm OS or Windows CE. If a palm device is synchronized to the desktop 900, the contents of the virtual notebook 1200 on the desktop 900 will be synchronized with the virtual notebook 1200 on the palm device.

The virtual notebook 1200 is a separate application that runs on a user's desktop independently of other applications. A virtual notebook 1200 can be used as a graphical clipboard for data from other applications (e.g., Word, Excel, etc.). Further, available tools (as described above) may be utilized in the virtual notebook 1200.

Drawing and Sketching

A user can create drawings using pens of various types, colors and widths. A flood fill and eraser tool may also aid in the drawing process. Such tools may be used freehand to create sketches.

A user can use available tools to create hard-line drawings, along with a stencil, that allows a user to constrain a tool to create a specific hard-line geometry (e.g., a straight line, rectangle, or circle). Stencils may also be used to create symbols such as a door, outlet, or sprinkler head. Geometry created using stencils may create an object that maintains properties (e.g., width, height, radius, etc.). Further, the objects and properties may be selected and edited. Objects may also be dragged and dropped to and from a notebook (e.g., virtual notebook 1200). Accordingly, notebooks may act as catalogs for organizing larger collections of predefined content.

A user may add a text block to a drawing using a text tool. A text block can be selected and edited in place or in a text editing dialog. Usual text formats may be supported such as font, font size, font style, word wrap, etc. Text may also be input using mechanisms available such as a physical keyboard, a virtual keyboard, and/or using handwriting recognition.

Drafting

Drafting is not fundamentally different from the sketching and hard-line drawing described above. Accordingly, additional tools and options to address the need for precision and efficiency in drafting may be provided.

Scale 2D drawing documents may have a scale property that is an internal representation of the scale of a document (e.g., ⅛ inch=1 foot). Further, a scale tool provides the ability to set the scale property by identifying a distance using an input device (e.g., drawing a line) and specifying a unit of measurement represented by the distance (e.g., 1 foot). Additionally, adjusting the scaling may modify the internal scale representation of the document without modifying the actual size of the document.

Snap

Support snapping to endpoints, midpoints and other geometric locations, as well as snapping perpendicular and tangent may be available.

Drawing Tools

Additional drawing tools, including trim, extend and offset may also be provided.

Precision and Numerical Input

A mechanism for efficiently defining geometry by entering or measuring out exact numeric values may be available. This may consist of a ruler-like graphic that is displayed while drawing lines or other geometry, which will display the current length and angle of the geometry as it is drawn. Typing while the ruler is displayed may set the length or angle directly for the geometry. The ruler extends beyond the current geometry in order to give visual feedback about available length values taking into account the drawing scale.

Dimensioning

Tools for creating dimensions may also be provided. Dimensions are objects that snap to geometry and may be associative.

Layers

Layered drawings are created using layer stacks. A layer stack is a collection of transparent workspaces 606 superimposed and registered for alignment. A layer stack provides access to various sheets in a stack using a list of the layers. A user can make a given layer active by selecting the desired layer in this list. The order in the list determines the order of layers in the stack, and thus the draw order. Layers do not determine color or other properties. All layers in the stack may have the same drawing scale by default.

Predefined Drawing Objects

Predefined drawing objects may allow the user to add pre-drawn objects to a drawing. Such objects may be similar to ACTIVESHAPES™, with plugs, sockets, and sizing handles. However, predefined drawing objects may not have expressions and may not be programmable. Pre-defined objects may also be dragged and dropped from web-based catalogs.

3D Modeling

A feature-based solid modeler for use in creating study models as well as more formal simulations or presentation models may be provided. The user-interface for modeling may be specifically tailored to the requirements of architectural models. One basic approach provides for the creation of sheets or blocks of material by drawing outlines in 2D and pulling the 2D outlines into 3D. Sheets are analogous to cardboard or foam-core-type materials and blocks are analogous to wood or clay. These materials can then be modified by cutting them with a knife tool or by extracting material using a router tool. Features created by cutting can be selected and positioned. Snapping and collision detection are active during model creation and editing to aid in creating precise geometric relationships.

Modeling may be performed in a document referred to as a modeling sheet. A modeling sheet document contains the model geometry and provides various projections of a model, including plan, elevation, axonometric, and perspective. A model may not have a separate existence outside of the modeling sheet document.

The contents of a 2D drawing document may also be rotated into 3D. The 2D geometry will appear on the ground plane in the 3D view. 3D modeling data can then be added using the 2D drawing as a reference. The 2D geometry, including lines, rectangles, circles, etc., may also be directly extruded upwards to create 3D shapes.

2D projections of the model such as elevation or plan may be rendered fully shaded or as line drawings. 3D projections like axonometric or perspective are rendered using shading that is realistic to the extent necessary to convey an immediate sense of geometric and spatial relationships. This level of rendering may include soft shadows, gradations of light across flat surfaces and realistic ambient lighting. Antialiasing may also be supported.

3D modeling may also include the ability to apply texture maps to surfaces and to select and manipulate texture maps and/or surfaces as objects. A user may drag a texture map around on a surface and resize the texture map interactively using handles (as described above with respect to FIG. 7). Textures may be tiled to cover the entire surface or act as decals.

3D geometry provides basic material properties that may include color, transparency, and shininess. Properties may be applied to the entire model geometry, and not to individual faces. Further, changes to surface properties may be updated dynamically.

When drawing tools such as pencils or markers are used over a 3D surface, the tool will draw onto the surface in 3D.

Several different types of camera tools may be provided for modifying 3D views interactively, including a simple lazy-susan type orbit tool, an unconstrained orbit tool, and walk or fly through tools.

Non-Graphical Data

To fully specify a building, geometric representations in drawings may be linked to specification data, including textual descriptions, manufacturers data, etc. Such data may then be extracted from a project database by downstream applications for bidding or facilities management. For example, door and window schedules can be generated automatically.

A tag property for geometric objects like lines may be available. Such a tag is a link to a record in another project document, which contains the additional data describing the object.

Special tools may be used to create special purpose types of tagged geometry. For example, a tool for drawing polylines that creates a geometrical shape linked by a tag to a preselected material type (e.g., a brick wall) can be used to determine the quantity of material needed (referred to as a quantity take off) by tracing with the tool in a separate layer superimposed over a construction drawing.

Figure 13:
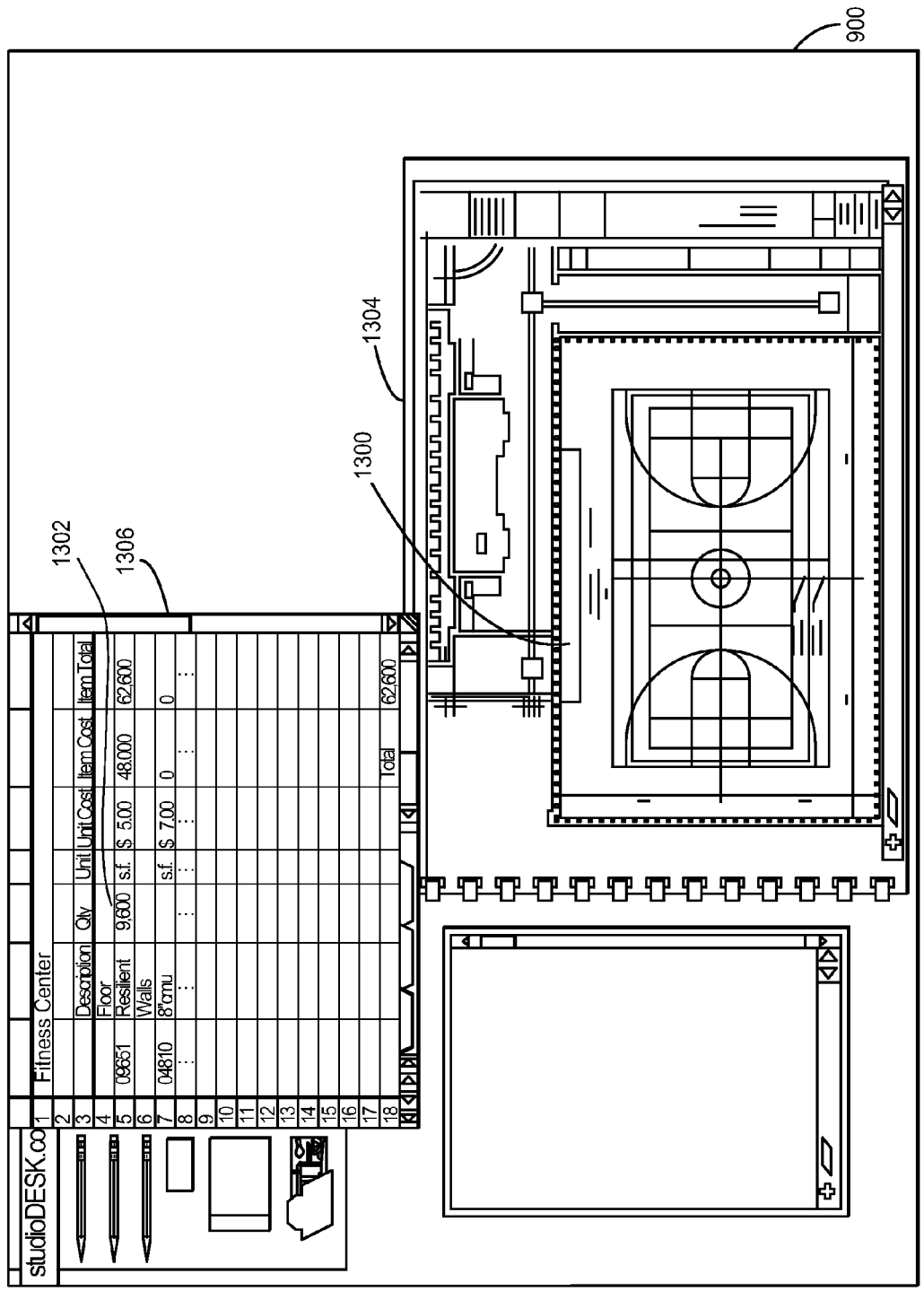
FIG. 13 illustrates a virtual desktop where numerical input is obtained from a drawing and utilized in a spreadsheet in accordance with one or more embodiments of the invention.

Native spreadsheet document support may enable support for quantitative analysis. Simple tools may also be created for computing areas for quantity take offs, for example. FIG. 13 illustrates a virtual desktop 900 where numerical input is obtained from a drawing and utilized in a spreadsheet. Box 1300 is placed around an existing plan 1304. Based on the scale of the drawing, the square footage of the boxed area may be automatically obtained and input into spreadsheet program 1306 as a quantity 1302. The spreadsheet program may then utilize the quantity 1302 for calculations such as flooring cost.

Links are bi-directional so a change to the source description may be followed back to all of the instances in the various drawings, to make sure changes do not introduce errors or inconsistencies.

Annotation and Markup

Referring back to FIG. 6, a user may annotate any document 610 using a special annotation pen and eraser or by drawing directly on a document 610 in an annotation layer. Annotations made with the annotation pen may be erased using an annotation eraser without affecting the original document 610 data (a pen tool may be used as an annotation tool by setting the pen tool's annotation property). An annotation pen can add annotation to any document 610 viewable on the workspace 606, even those for which the user doesn't have write access. If a user doesn't have write access to a document 610 or if pen strokes are not supported by the document 610 (e.g. an image or a Word document 610), any pen that the user uses on the document 610 will act as an annotation pen. Annotation may create stroke data. Other types of data (bitmap, 3D, text) may not be a permissible mechanism for creating annotation. Further, if desirable, the workspace 606 itself may be used as the container for the markup.

Annotations may conceptually be part of a document 610 and travel or attach to the document 610. Thereafter, when a user copies a document 610, annotations may be included. Further, when such a document 610 is copied or archived, the annotations may also be included. For example, a word processing document 610 with annotation may be presented as a single document 610.

If a user emails a document outside of an application (e.g., a site 602, project 604, workspace 606, etc.), the user may have the choice of flattening the document 610. For example, if an image document 610 is flattened, annotations associated with the image may become part of the actual image data. In another example, annotation on a word processing document 610 may be converted to word processing data when the word processing document is flattened.

Any document 610 may be annotated, even documents 610 for which the user does not have write access. To provide such annotation capabilities, one or more of the following options may be utilized:

(1) special annotation tools;
(2) a transparent annotation layer for all documents 610;
(3) only documents 610 that have been flattened into read-only bitmaps (like marking up a copy) can be annotated; and
(4) annotation of a document 610 merely draws into the actual document 610 itself (all documents 610 may support strokes).

Administration and Access Control

Ownership may be defined for a global list of users. Such a list may comprise user names, passwords, and tags (e.g., group membership, role). Additionally, projects 604 may include a list of users with additional properties added (e.g., a "principal" property).

Certificates as an option may also be supported. Further, access control lists (ACLs) (a set of data associated with a file, directory or other resource that defines the permissions that users and/or groups have for accessing it) may be provided on a per-project 604 and/or per-document 610 basis. Additionally, two people with write-access may have the ability to edit the same document 610 at the same time.

Personal Digital Assistant (PDA) Support

Figure 14:
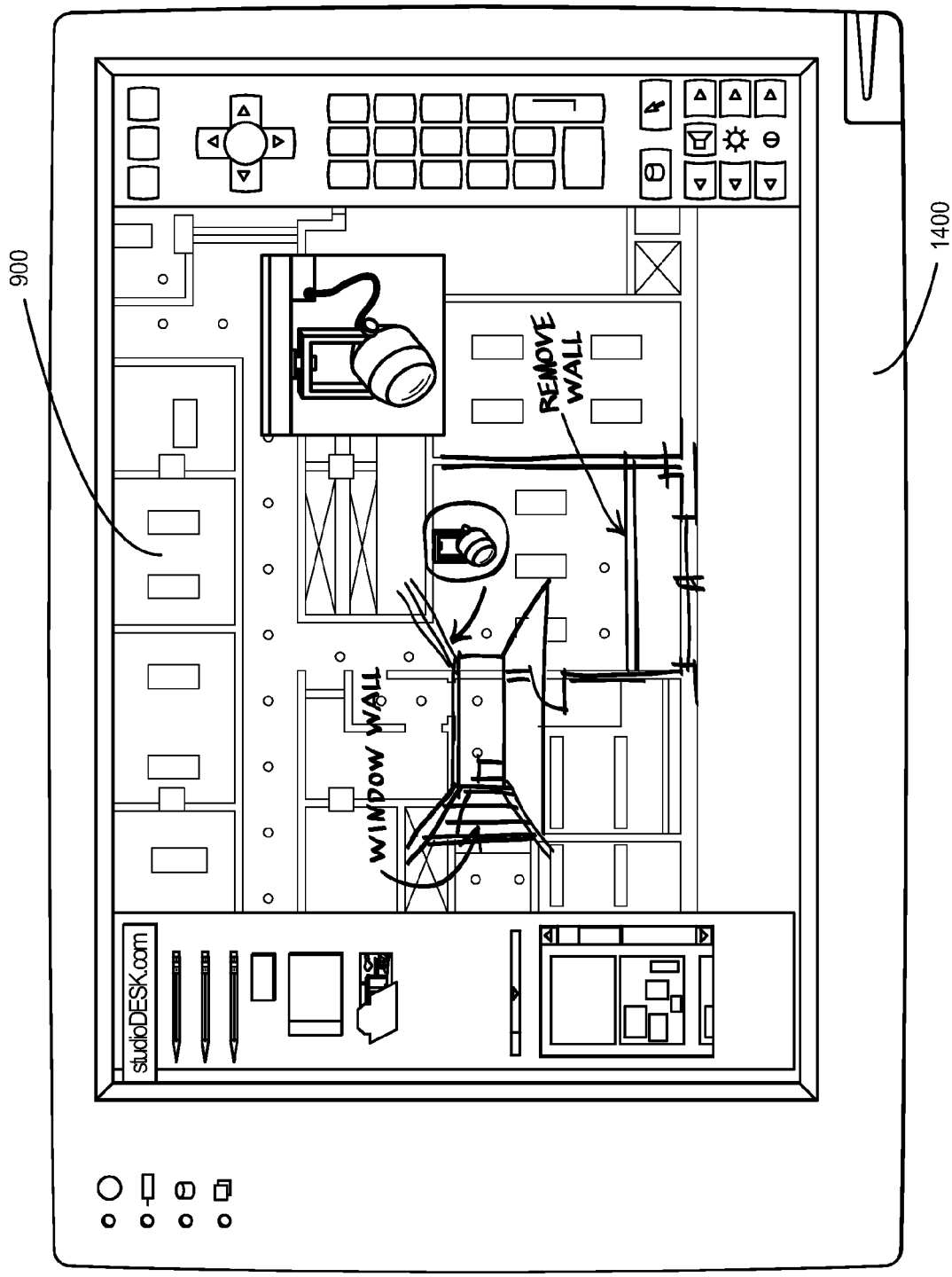
FIG. 14 illustrates the use of PDA in accordance with one or more embodiments of the invention.

FIG. 14 illustrates a PDA in accordance with one or more embodiments of the invention. A tablet may provide a PDA (such as PDA 1400 of FIG. 14) as a pen input device (referred to as a pen tablet) for an application running on a client. Accordingly, a standard PDA may be used as a pen tablet. By providing such capabilities, persons who do not have a pen tablet are provided with the opportunity to try a pen tablet type of application. Thus, the pen tablet may provide exposure of the invention to a much wider group of people and users.

A user may run a pen tablet when a PDA is plugged into a PC (or Macintosh) running an application. The PDA screen is mapped to a 160×160 area on a display area of the PC. A user can move this area by dragging the area with an input device such as a mouse or by using a pan tool on the PDA. Data within the mapped area on the PC will appear in the PDA screen as a non-editable background. Conversely, strokes drawn on the PDA will be drawn on the PC within the mapped area. A PDA may provide a thick and thin pen.

A notebook may provide the user of a PDA 1400 with an off-line designer's notebook. FIG. 14 illustrates the notebook or virtual desktop 900 on a PDA 1400. A notebook as referred to herein is a multi-page notebook that the user can load with images and drawings from the application on the PC, then work off-line with them on a PDA 1400, using them for reference and annotating them using a selection of basic drawing tools. The user can also create sketches and drawings in the notebook. Annotations and drawings created off-line can be uploaded and synchronized with a PC when the PDA is connected to (or communicates with) the PC. The PDA synchronizes with a virtual PDA floating on the PC desktop. Data may then be transferred between the virtual PDA to and from the virtual desktop 900 using drag and drop. Further, the virtual PDA on the desktop 900 may be used independently of the PDA.

Screen Capture

A user may capture images of other documents on a PC desktop. For example, a user may have a drawing file in another application (e.g., AutoCAD) that the user wishes to annotate, mark-up, or refer to. In some cases, such a file may be imported directly. However, such importation may consume valuable system resources. Further, the user may merely require a snapshot of data currently visible on the screen.

Two approaches may be utilized for screen capture operations as follows:

(1) Transparent Browser

Figure 15:
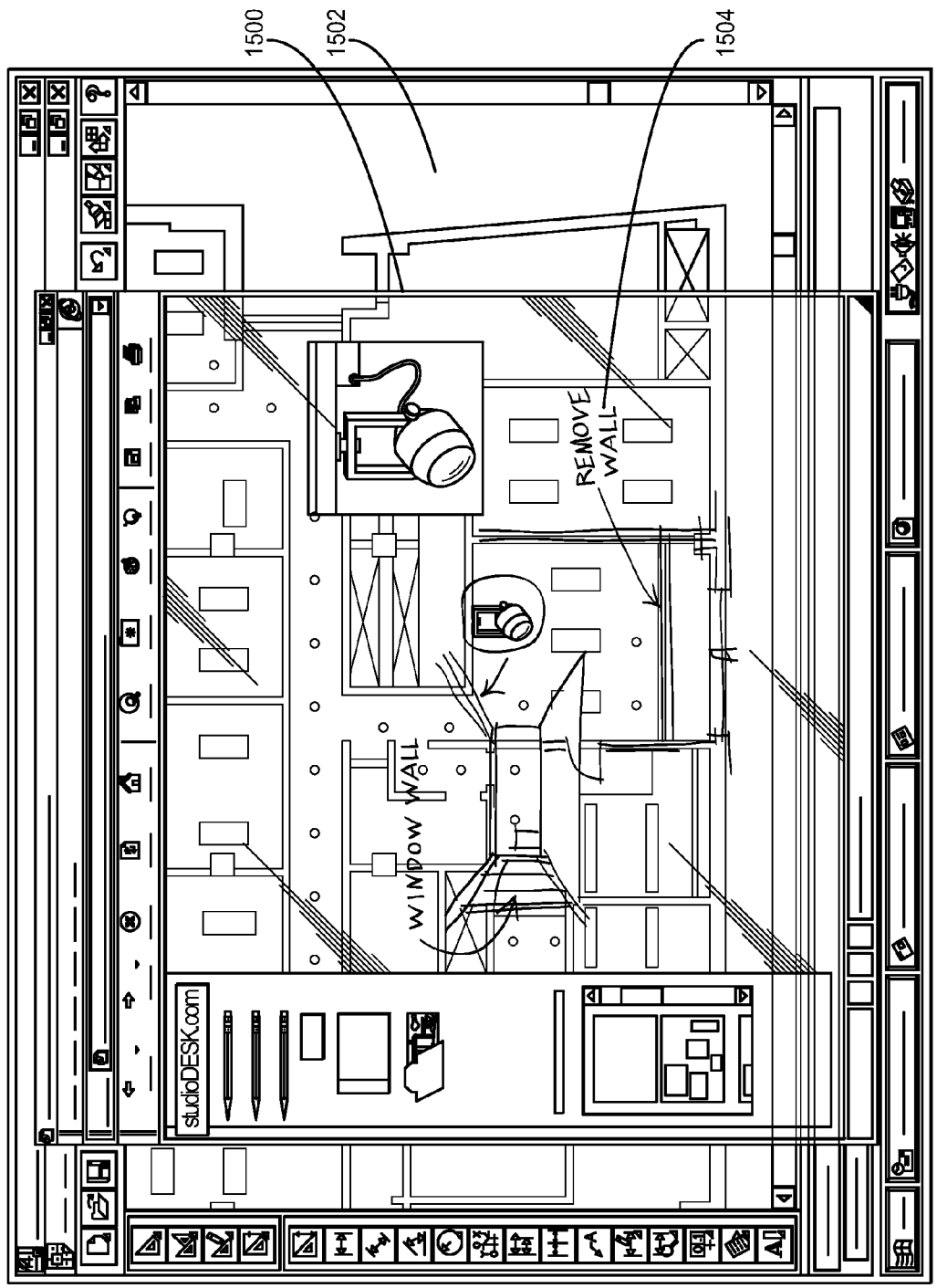
FIG. 15 illustrates a transparent browser provided in accordance with one or more embodiments of the invention.

A transparent browser provides the ability to see-through a screen (i.e., provides a transparency). A slider controls the transparency of the workspace itself. When transparent, a user can see through the browser onto the data or document located behind the browser on the desktop 900. Further, a user can capture the information/data visible through the browser and add it to the workspace as a bitmap image (e.g., by clicking a button). A captured image may then be annotated using the normal annotation tools. FIG. 15 illustrates a transparent browser 1500 provided in accordance with one or more embodiments of the invention. Window 1502 can be viewed through transparent browser 1500. Further, the image in window 1502 may be captured and the user can annotate 1504 the captured image.

(2) Screen Capture Utility

A stand-alone utility may allow a user to capture any area of a virtual desktop and insert it as a bitmap into a workspace. When a user clicks on a "Capture" command, the workspace minimizes and the cursor changes to a capture cursor. The user may then define/designate an area to be captured (e.g., by dragging out a rectangle). Once an area has been defined, the defined area may be automatically captured and inserted into the workspace as a bitmap image. This image may then be annotated and otherwise manipulated, similar to any other bitmap image document.

Conclusion

This concludes the description of one or more embodiments of the invention. The following describes some alternative embodiments for accomplishing the present invention without departing from the scope of the present invention. For example, any type of computer, such as a mainframe, minicomputer, workstation or personal computer, could be used with the present invention. In addition, any software program, application or operating system having a user interface could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for providing access to architectural documents comprising:
   displaying a graphical virtual hand held computing device on a display of a desktop computer;
   associating one or more architectural documents with the virtual hand held computing device by graphically adding the architectural documents to the virtual hand held computing device using an input device;
   annotating the one or more architectural documents on the actual hand held computing device when the actual hand computing device is not communicatively coupled to the desktop computer;
   synchronizing the virtual hand held computing device with an actual hand held computing device wherein the synchronization provides that the information displayed on the virtual hand held computing device matches information displayed on the actual hand held computing device, wherein the synchronizing is performed when the actual hand held computing device is communicatively coupled to the desktop computer.

2. The method of claim 1, wherein the hand held computing device comprises a personal digital assistant (PDA).

3. The method of claim 1, wherein the graphical virtual hand held computing device is displayed via a website accessed by the desktop computer.

4. The method of claim 1, further comprising:
   moving the graphical virtual hand held computing device within a display area of the display on the desktop computer, wherein the moving is performed by dragging the graphical virtual hand held computing device using an input device.

5. The method of claim 1, further comprising:
annotating the one or more architectural documents on the virtual hand held computing device independently of the actual hand held computing device; and
wherein the synchronizing is performed when the actual hand held computing device is communicatively coupled to the desktop computer.

6. A computer-implemented apparatus for providing access to architectural documents comprising:
a graphical virtual hand held computing device that is displayed on a display of a desktop computer;
one or more architectural documents associated with the virtual hand held computing device, wherein the association is established by graphically adding the architectural documents to the virtual hand held computing device using an input device;
wherein the one or more architectural documents are annotated on the actual hand held computing device when the actual hand computing device is not communicatively coupled to the desktop computer;
wherein the hand held computing device is synchronized with an actual hand held computing device wherein a synchronization process ensures that information displayed on the virtual hand held computing device matches information displayed on the actual hand held computing device, wherein the synchronizing is performed when the actual hand held computing device is communicatively coupled to the desktop computer.

7. The apparatus of claim 6, wherein the hand held computing device comprises a personal digital assistant (PDA).

8. The apparatus of claim 6, wherein the graphical virtual hand held computing device is displayed via a website accessed by the desktop computer.

9. The apparatus of claim 6, wherein:
the graphical virtual hand held computing device is moved within a display area of the display on the desktop computer, wherein the moving is performed by dragging the graphical virtual hand held computing device using an input device.

10. The apparatus of claim 6, wherein:
the one or more architectural documents are annotated on the virtual hand held computing device independently of the actual hand held computing device; and
the synchronizing is performed when the actual hand held computing device is communicatively coupled to the desktop computer.

11. An article of manufacture comprising a non-transitory program storage device readable by a computer, tangibly embodying at least one program of instructions executable by the computer to perform method steps of providing access to architectural documents, the method steps comprising:
displaying a graphical virtual hand held computing device on a display of a desktop computer;
associating one or more architectural documents with the virtual hand held computing device by graphically adding the architectural documents to the virtual hand held computing device using an input device;
annotating the one or more architectural documents on the actual hand held computing device when the actual hand computing device is not communicatively coupled to the desktop computer;
synchronizing the virtual hand held computing device with an actual hand held computing device wherein the synchronization provides that the information displayed on the virtual hand held computing device matches information displayed on the actual hand held computing device, wherein the synchronizing is performed when the actual hand held computing device is communicatively coupled to the desktop computer.

12. The article of manufacture of claim 11, wherein the hand held computing device comprises a personal digital assistant (PDA).

13. The article of manufacture of claim 11, wherein the graphical virtual hand held computing device is displayed via a website accessed by the desktop computer.

14. The article of manufacture of claim 11, the method steps further comprising:
moving the graphical virtual hand held computing device within a display area of the display on the desktop computer, wherein the moving is performed by dragging the graphical virtual hand held computing device using an input device.

15. The article of manufacture of claim 11, the method steps further comprising:
annotating the one or more architectural documents on the virtual hand held computing device independently of the actual hand held computing device; and
wherein the synchronizing is performed when the actual hand held computing device is communicatively coupled to the desktop computer.

16. A computer-implemented method for capturing a screen image comprising:
displaying, on a display device via a desktop computer, a virtual desktop comprised of one or more windows;
activating a command to capture an image;
in response to the command:
changing a cursor to a capture cursor;
defining, via the capture cursor, an area of the virtual desktop to be captured;
capturing the defined area; and
inserting the captured defined area into a workspace as a bitmap image.

17. The method of claim 16, wherein the workspace is minimized in response to the activating.

18. The method of claim 16, wherein:
the defining comprises displaying a transparent browser wherein the one or more windows can be viewed through the transparent browser; and
the defined area comprises an area being viewed through the transparent browser.

19. The method of claim 16, further comprising annotating the bitmap image in the workspace.

* * * * *

UNITED STATES PATENT AND TRADEMARK OFFICE
CERTIFICATE OF CORRECTION

| | | |
|---|---|---|
| PATENT NO. | : 9,053,080 B2 | |
| APPLICATION NO. | : 13/768293 | |
| DATED | : June 9, 2015 | |
| INVENTOR(S) | : Douglas G. Look, Lawrence D. Felser and John R. Wallace | |

It is certified that error appears in the above-identified patent and that said Letters Patent is hereby corrected as shown below:

In the claims

Column 18

Lines 45-48, delete the text, "annotating the one or more architectural documents on the actual hand held computing device when the actual hand computing device is not communicatively coupled to the desktop computer;"

and insert the text, --annotating the one or more architectural documents on the actual hand held computing device when the actual hand held computing device is not communicatively coupled to the desktop computer;--

Column 19

Lines 17-20, delete the text, "wherein the one or more architectural documents are annotated on the actual hand held computing device when the actual hand computing device is not communicatively coupled to the desktop computer;"

and insert the text, --wherein the one or more architectural documents are annotated on the actual hand held computing device when the actual hand held computing device is not communicatively coupled to the desktop computer;--

Column 20

Lines 1-4, delete the text, "annotating the one or more architectural documents on the actual hand held computing device when the actual hand computing device is not communicatively coupled to the desktop computer;"

and insert the text, --annotating the one or more architectural documents on the actual hand held computing device when the actual hand held computing device is not communicatively coupled to the desktop computer;--

Signed and Sealed this
Seventh Day of June, 2016

Michelle K. Lee
*Director of the United States Patent and Trademark Office*